United States Patent
Kim

(10) Patent No.: US 12,388,603 B2
(45) Date of Patent: *Aug. 12, 2025

(54) METHOD AND APPARATUS FOR TRANSMITTING SOUNDING REFERENCE SIGNAL FOR POSITIONING IN MOBILE WIRELESS COMMUNICATION SYSTEM

(71) Applicants: BLACKPIN INC., Seoul (KR); Soenghun Kim, Gyeonggi-do (KR)

(72) Inventor: Soenghun Kim, Gyeonggi-do (KR)

(73) Assignees: BLACKPIN INC., Seoul (KR); Soenghun Kim, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/513,631

(22) Filed: Nov. 20, 2023

(65) Prior Publication Data

US 2024/0089059 A1  Mar. 14, 2024

Related U.S. Application Data

(63) Continuation of application No. 18/128,186, filed on Mar. 29, 2023, now Pat. No. 11,863,490, which is a (Continued)

(30) Foreign Application Priority Data

Oct. 5, 2021 (KR) .................. 10-2021-0131340

(51) Int. Cl.
*H04L 5/00* (2006.01)
*H04W 76/20* (2018.01)
*H04W 76/30* (2018.01)

(52) U.S. Cl.
CPC .......... *H04L 5/0051* (2013.01); *H04W 76/20* (2018.02); *H04W 76/30* (2018.02)

(58) Field of Classification Search
CPC ...... H04L 5/0051; H04W 76/20; H04W 76/30
See application file for complete search history.

(56) References Cited

U.S. PATENT DOCUMENTS

2021/0400734 A1* 12/2021 Zhang .................. H04W 72/21
2022/0120842 A1*  4/2022 Edge ..................... H04W 76/19
(Continued)

FOREIGN PATENT DOCUMENTS

WO  2021-162784 A1  8/2021

OTHER PUBLICATIONS

Huawei, '[AT115-e][615][POS] UL and UL DL positioning in RRC_INACTIVE (Huawei)', R2-2108946, 3GPP TSG-RAN WG2 Meeting #115-e, Electronic, Aug. 30, 2021.
(Continued)

*Primary Examiner* — Will W Lin
(74) *Attorney, Agent, or Firm* — Nicholas Park

(57) ABSTRACT

A method and apparatus for positioning in a mobile communication system are provided. Method for positioning includes transmitting a UECapabilityInformation, transmitting a provideCapabilities, receiving a ProvideAssistanceData, receiving a RRCRelease and transmitting a positioning SRS in RRC_INACTIVE state. The RRCRelease includes a first information and a second information, the first information is related to a configuration of SRS in RRC_INACTIVE and the second information is related to a BWP.

14 Claims, 20 Drawing Sheets

Related U.S. Application Data continuation of application No. PCT/KR2022/014068, filed on Sep. 21, 2022.

(56) References Cited

U.S. PATENT DOCUMENTS

| | | | | |
|---|---|---|---|---|
| 2022/0225462 A1* | 7/2022 | Manolakos | ............ | H04W 76/20 |
| 2022/0342028 A1* | 10/2022 | Sun | ........................ | H04L 5/0051 |
| 2022/0368496 A1* | 11/2022 | Shreevastav | .......... | H04L 5/0094 |
| 2022/0369271 A1* | 11/2022 | Jiang | ..................... | H04W 76/27 |
| 2023/0049277 A1* | 2/2023 | Lee | ........................ | G01S 5/0205 |
| 2023/0188288 A1* | 6/2023 | Lee | ..................... | H04B 17/318 |
| | | | | 370/329 |

OTHER PUBLICATIONS

Lenovo, 'On Positioning in RRC_INACTIVE state', R2-2108128, 3GPP TSG RAN WG2 Meeting#115-e, Online, Aug. 5, 2021.
LTE; 5G; Lte Positioning Protocol (LPP), 3GPP TS 37.355 version 16.5.0 Release 16, Sep. 8, 2021.
5G; NR; User Equipment (UE) radio access capabilities, 3GPP TS 38.306 version 16.5.0 Release 16, Sep. 8, 2021.
3rd Generation Partnership Project; Technical Specification Group Radio Access Network; NR; Radio Resource Control (RRC) protocol specification, 3GPP TS 38.331 version 16.5.0 Release 16, Jul. 6, 2021.
Moderator (Intel Corporation), Feature Lead Summary#3 for E-mail Discussion [105-e-NR-ePos-02], R1-2106334, 3GPP TSG RAN WG1 #105e, e-Meeting, May 28, 2021.

* cited by examiner

User Plane Protocol Stack

Control Plane Protocol Stack

FIG. 2A

| 2a-01 | GNSS positioning method | based on navigation satellite system |

| 2a-03 | Barometric pressure sensor positioning | based on measured atmospheric pressure and a reference atmospheric pressure |

| 2a-05 | OTDOA positioning | based on measurements taken at the UE of downlink radio signals from multiple E-UTRA TPs |

| 2a-07 | DL-AoD positioning | based on DL-PRS-RSRP measurements taken at the UE of downlink radio signals from multiple NR TRPs |

| 2a-09 | DL-TDOA positioning | based on DL RSTD (and optionally DL-PRS-RSRP) measurements taken at the UE of downlink radio signals from multiple NR TRPs |

| 2a-11 | UL-TDOA positioning | based on UL-RTOA (and optionally UL-SRS-RSRP) measurements taken at different TRPs of uplink radio signals from UE |

FIG. 2B

| | | posSibType | assistanceDataElement |
|---|---|---|---|
| 2b-01 | GNSS Common Assistance Data | posSibType1-1 | GNSS-ReferenceTime |
| | | posSibType1-2 | GNSS-ReferenceLocation |
| | | posSibType1-3 | GNSS-IonosphericModel |
| | | posSibType1-4 | GNSS-EarthOrientationParameters |
| | | posSibType1-5 | GNSS-RTK-ReferenceStationInfo |
| | | posSibType1-6 | GNSS-RTK-CommonObservationInfo |
| | | posSibType1-7 | GNSS-RTK-AuxiliaryStationData |
| | | posSibType1-8 | GNSS-SSR-CorrectionPoints |
| 2b-03 | GNSS Generic Assistance | posSibType2-1 | GNSS-TimeModelList |
| | | posSibType2-2 | GNSS-DifferentialCorrections |
| | | posSibType2-3 | GNSS-NavigationModel |
| | | posSibType2-4 | GNSS-RealTimeIntegrity |
| | | posSibType2-5 | GNSS-DataBitAssistance |
| | | posSibType2-6 | GNSS-AcquisitionAssistance |
| | | posSibType2-7 | GNSS-Almanac |
| | | posSibType2-8 | GNSS-UTC-Model |
| | | posSibType2-9 | GNSS-AuxiliaryInformation |
| | | posSibType2-10 | BDS-DifferentialCorrections |
| | | posSibType2-11 | BDS-GridModelParameter |
| | | posSibType2-12 | GNSS-RTK-Observations |
| | | posSibType2-13 | GLO-RTK-BiasInformation |
| | | posSibType2-14 | GNSS-RTK-MAC-CorrectionDifferences |
| | | posSibType2-15 | GNSS-RTK-Residuals |
| | | posSibType2-16 | GNSS-RTK-FKP-Gradients |
| | | posSibType2-17 | GNSS-SSR-OrbitCorrections |
| | | posSibType2-18 | GNSS-SSR-ClockCorrections |
| | | posSibType2-19 | GNSS-SSR-CodeBias |
| | | posSibType2-20 | GNSS-SSR-URA |
| | | posSibType2-21 | GNSS-SSR-PhaseBias |
| | | posSibType2-22 | GNSS-SSR-STEC-Correction |
| | | posSibType2-23 | GNSS-SSR-GriddedCorrection |
| | | posSibType2-24 | NavIC-DifferentialCorrections |
| | | posSibType2-25 | NavIC-GridModelParameter |
| 2b-05 | OTDOA Assistance Data | posSibType3-1 | OTDOA-UE-Assisted |
| 2b-07 | Barometric Assistance Data | posSibType4-1 | Sensor-AssistanceDataList |
| 2b-09 | TBS Assistance Data | posSibType5-1 | TBS-AssistanceDataList |
| 2b-11 | NR DL-TDOA/DL-AoD Assistance Data | posSibType6-1 | NR-DL-PRS-AssistanceData · 2b-13 |
| | | posSibType6-2 | NR-UEB-TRP-LocationData |
| | | posSibType6-3 | NR-UEB-TRP-RTD-Info |
| | | posSibType6-4 | NR-DL-PRS-ConditionalAssistanceData · 2b-15 |

METHOD AND APPARATUS FOR TRANSMITTING SOUNDING REFERENCE SIGNAL FOR POSITIONING IN MOBILE WIRELESS COMMUNICATION SYSTEM

CROSS-REFERENCE TO RELATED APPLICATION

This application is a Continuation Application of U.S. patent application Ser. No. 18/128,186, Filed on Mar. 29, 2023, at the time of filing of the present Patent Application, which is a US Bypass Continuation Application of International Application No. PCT/KR2022/014068, filed on Sep. 21, 2022, which claims priority to and the benefit of Korean Patent Application No. 10-2021-0131340, filed on Oct. 5, 2021, the disclosure of which is incorporated herein by reference in its entirety.

BACKGROUND

Technical Field

The present disclosure relates to positioning in a mobile communication system. More specifically, the present disclosure relates to performing positioning based on validity information.

Related Art

To meet the increasing demand for wireless data traffic since the commercialization of 4th generation (4G) communication systems, the 5th generation (5G) system is being developed. For the sake of high, 5G system introduced millimeter wave (mmW) frequency bands (e. g. 60 GHz bands). In order to increase the propagation distance by mitigating propagation loss in the 5G communication system, various techniques are introduced such as beamforming, massive multiple—input multiple output (MIMO), full dimensional MIMO (FD-MIMO), array antenna, analog beamforming, and large-scale antenna. In addition, base station is divided into a central unit and plurality of distribute units for better scalability. To facilitate introduction of various services, 5G communication system targets supporting higher data rate and smaller latency.

Various attempts are being made to apply the 5G communication system to the IoT network. For example, 5G communication such as sensor network, machine to machine communication (M2M), and machine type communication (MTC) is being implemented by techniques such as beam forming, MIMO, and array antenna.

The importance of terminal positioning in new services such as the above-mentioned machine communication is increasing. Positioning can be estimated in consideration of the measurement result of the base station measuring the uplink reference signal transmitted by the terminal or the measurement result of the terminal measuring the downlink reference signal transmitted by the base station.

SUMMARY

Aspects of the present disclosure are to address the various methods of implementing positioning in mobile communication system. Accordingly, an aspect of the present disclosure is to provide a method and an apparatus for transmitting a UECapabilityInformation, transmitting a provideCapabilities, receiving a ProvideAssistanceData, receiving a RRCRelease and transmitting a positioning SRS in RRC_INACTIVE state. The RRCRelease includes a first information and a second information, the first information is related to a configuration of SRS in RRC_INACTIVE and the second information is related to a BWP.

BRIEF DESCRIPTION OF THE DRAWINGS

FIG. 2A is a diagram illustrating positioning method according to the first embodiment of the present invention.

FIG. 2B is a diagram illustrating the mapping between positioning assistance data and positioning system information block.

DETAILED DESCRIPTION

Figure 1A:
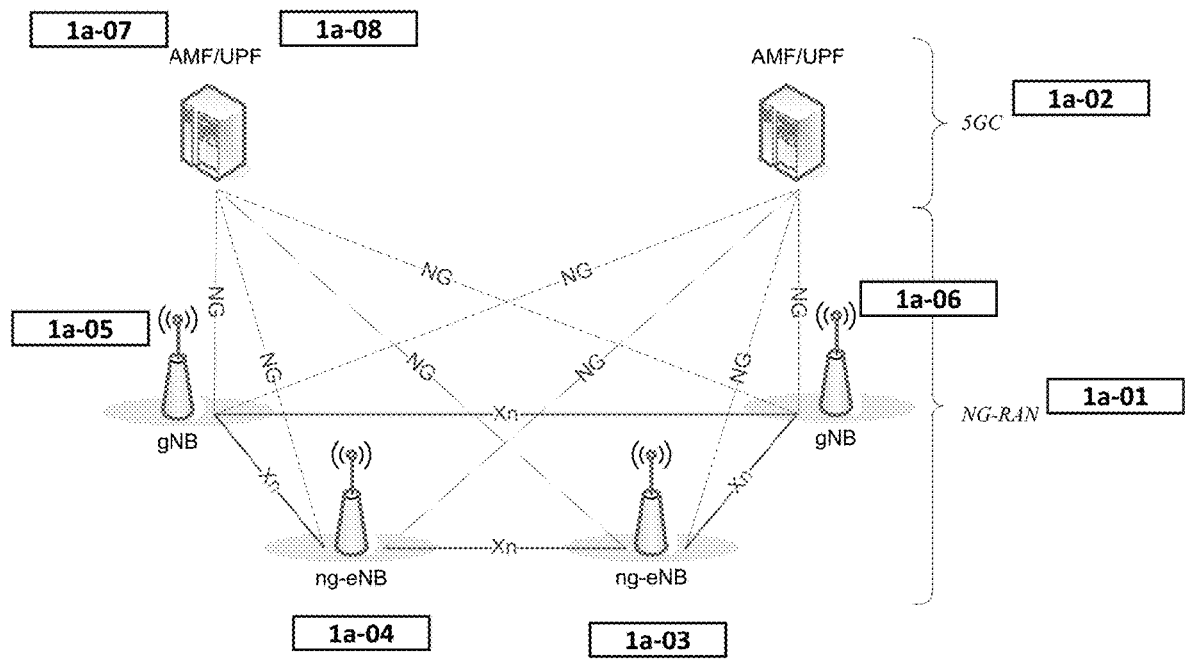
FIG. 1A is a diagram illustrating the architecture of an 5G system and a NG-RAN.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms used, in the following description, for indicating access nodes, network entities, messages, interfaces between network entities, and diverse identity information is provided for convenience of explanation. Accordingly, the terms used in the following description are not limited to specific meanings but may be replaced by other terms equivalent in technical meanings.

In the following descriptions, the terms and definitions given in the 3GPP standards are used for convenience of explanation. However, the present disclosure is not limited by use of these terms and definitions and other arbitrary terms and definitions may be employed instead.

Table 1 lists the acronyms used throughout the present disclosure.

TABLE 1

| Acronym | Full name | Acronym | Full name |
| --- | --- | --- | --- |
| 5GC | 5G Core Network | RACH | Random Access Channel |
| ACK | Acknowledgement | RAN | Radio Access Network |
| AM | Acknowledged Mode | RA-RNTI | Random Access RNTI |
| AMF | Access and Mobility Management Function | RAT | Radio Access Technology |
| ARQ | Automatic Repeat Request | RB | Radio Bearer |
| AS | Access Stratum | RLC | Radio Link Control |
| ASN.1 | Abstract Syntax Notation One | RNA | RAN-based Notification Area |
| BSR | Buffer Status Report | RNAU | RAN-based Notification Area Update |
| BWP | Bandwidth Part | RNTI | Radio Network Temporary Identifier |
| CA | Carrier Aggregation | RRC | Radio Resource Control |
| CAG | Closed Access Group | RRM | Radio Resource Management |
| CG | Cell Group | RSRP | Reference Signal Received Power |
| C-RNTI | Cell RNTI | RSRQ | Reference Signal Received Quality |
| CSI | Channel State Information | RSSI | Received Signal Strength Indicator |

TABLE 1-continued

| Acronym | Full name | Acronym | Full name |
| --- | --- | --- | --- |
| DCI | Downlink Control Information | SCell | Secondary Cell |
| DRB | (user) Data Radio Bearer | SCS | Subcarrier Spacing |
| DRX | Discontinuous Reception | SDAP | Service Data Adaptation Protocol |
| HARQ | Hybrid Automatic Repeat Request | SDU | Service Data Unit |
| IE | Information element | SFN | System Frame Number |
| LCG | Logical Channel Group | S-GW | Serving Gateway |
| MAC | Medium Access Control | SI | System Information |
| MIB | Master Information Block | SIB | System Information Block |
| NAS | Non-Access Stratum | SpCell | Special Cell |
| NG-RAN | NG Radio Access Network | SRB | Signalling Radio Bearer |
| NR | NR Radio Access | SRS | Sounding Reference Signal |
| PBR | Prioritised Bit Rate | SSB | SS/PBCH block |
| PCell | Primary Cell | SSS | Secondary Synchronisation Signal |
| PCI | Physical Cell Identifier | SUL | Supplementary Uplink |
| PDCCH | Physical Downlink Control Channel | TM | Transparent Mode |
| PDCP | Packet Data Convergence Protocol | UCI | Uplink Control Information |
| PDSCH | Physical Downlink Shared Channel | UE | User Equipment |
| PDU | Protocol Data Unit | UM | Unacknowledged Mode |
| PHR | Power Headroom Report | CRP | Cell Reselection Priority |
| PLMN | Public Land Mobile Network | LPP | LTE positioning protocol |
| PRACH | Physical Random Access Channel | posSIB | positioning SIB |
| PRB | Physical Resource Block | posSI | positioning System Information |
| PSS | Primary Synchronisation Signal | TRP | Transmission-Reception Point |
| PUCCH | Physical Uplink Control Channel | DL-TDOA | Downlink Time Difference Of Arrival |
| PUSCH | Physical Uplink Shared Channel | | |

Table 2 lists the terminologies and their definition used throughout the present disclosure.

TABLE 2

| Terminology | Definition |
| --- | --- |
| allowedCG-List | List of configured grants for the corresponding logical channel. This restriction applies only when the UL grant is a configured grant. If present, UL MAC SDUs from this logical channel can only be mapped to the indicated configured grant configuration. If the size of the sequence is zero, then UL MAC SDUs from this logical channel cannot be mapped to any configured grant configurations. If the field is not present, UL MAC SDUs from this logical channel can be mapped to any configured grant configurations. |
| allowedSCS-List | List of allowed sub-carrier spacings for the corresponding logical channel. If present, UL MAC SDUs from this logical channel can only be mapped to the indicated numerology. Otherwise, UL MAC SDUs from this logical channel can be mapped to any configured numerology. |
| allowedServingCells | List of allowed serving cells for the corresponding logical channel. If present, UL MAC SDUs from this logical channel can only be mapped to the serving cells indicated in this list. Otherwise, UL MAC SDUs from this logical channel can be mapped to any configured serving cell of this cell group. |
| Carrier frequency | center frequency of the cell. |
| Cell | combination of downlink and optionally uplink resources. The linking between the carrier frequency of the downlink resources and the carrier frequency of the uplink resources is indicated in the system information transmitted on the downlink resources. |
| Cell Group | in dual connectivity, a group of serving cells associated with either the MeNB or the SeNB. |

TABLE 2-continued

| Terminology | Definition |
| --- | --- |
| Cell reselection | A process to find a better suitable cell than the current serving cell based on the system information received in the current serving cell |
| Cell selection | A process to find a suitable cell either blindly or based on the stored information |
| Dedicated signalling | Signalling sent on DCCH logical channel between the network and a single UE. |
| discardTimer | Timer to control the discard of a PDCP SDU. Starting when the SDU arrives. Upon expiry, the SDU is discarded. |
| F | The Format field in MAC subheader indicates the size of the Length field. |
| Field | The individual contents of an information element are referred to as fields. |
| Frequency layer | set of cells with the same carrier frequency. |
| Global cell identity | An identity to uniquely identifying an NR cell. It is consisted of cellIdentity and plmn-Identity of the first PLMN-Identity in plmn-IdentityList in SIB 1. |
| gNB | node providing NR user plane and control plane protocol terminations towards the UE, and connected via the NG interface to the 5GC. |
| Handover | procedure that changes the serving cell of a UE in RRC_CONNECTED. |
| Information element | A structural element containing single or multiple fields is referred as information element. |
| L | The Length field in MAC subheader indicates the length of the corresponding MAC SDU or of the corresponding MAC CE |
| LCID | 6 bit logical channel identity in MAC subheader to denote which logical channel traffic or which MAC CE is included in the MAC subPDU |
| MAC-1 | Message Authentication Code-Integrity. 16 bit or 32 bit bit string calculated by NR Integrity Algorithm based on the security key and various fresh inputs |
| Logical channel | a logical path between a RLC entity and a MAC entity. There are multiple logical channel types depending on what type of information is transferred e.g. CCCH (Common Control Channel), DCCH (Dedicate Control Channel), DTCH (Dedicate Traffic Channel), PCCH (Paging Control Channel) |
| LogicalChannelConfig | The IE LogicalChannelConfig is used to configure the logical channel parameters. It includes priority, prioritisedBitRate, allowedServingCells, allowedSCS-List, maxPUSCH-Duration, logicalChannelGroup, allowedCG-List etc |
| logicalChannelGroup | ID of the logical channel group, as specified in TS 38.321, which the logical channel belongs to |
| MAC CE | Control Element generated by a MAC entity. Multiple types of MAC CEs are defined, each of which is indicated by corresponding LCID. A MAC CE and a corresponding MAC sub-header comprises MAC subPDU |
| Master Cell Group | in MR-DC, a group of serving cells associated with the Master Node, comprising of the SpCell (PCell) and optionally one or more SCells. |
| maxPUSCH-Duration | Restriction on PUSCH-duration for the corresponding logical channel. If present, UL MAC SDUs from this logical channel can only be transmitted using uplink grants that result in a PUSCH duration shorter than or equal to the duration indicated by this field. Otherwise, UL MAC SDUs from this logical channel can be transmitted using an uplink grant resulting in any PUSCH duration. |
| NR | NR radio access |
| PCell | SpCell of a master cell group. |
| PDCP entity reestablishment | The process triggered upon upper layer request. It includes the initialization of state variables, reset of header compression and manipulating of stored PDCP SDUs and PDCP PDUs. The details can be found in 5.1.2 of 38.323 |
| PDCP suspend | The process triggered upon upper layer request. When triggered, transmitting PDCP entity set TX_NEXT to the initial value and discard all stored PDCP PDUs. The receiving entity stop and reset t-Reordering, deliver all stored PDCP SDUs to the upper layer and set RX_NEXT and RX_DELIV to the initial value |
| PDCP-config | The IE PDCP-Config is used to set the configurable PDCP parameters for signalling and data radio bearers. For a data radio bearer, discardTimer, pdcp-SN-Size, header compression parameters, t-Reordering and whether integrity protection is enabled are configured. For a signaling radio bearer, t-Reordering can be configured |
| PLMN ID Check | the process that checks whether a PLMN ID is the RPLMN identity or an EPLMN identity of the UE. |

TABLE 2-continued

| Terminology | Definition |
|---|---|
| Primary Cell | The MCG cell, operating on the primary frequency, in which the UE either performs the initial connection establishment procedure or initiates the connection re-establishment procedure. |
| Primary SCG Cell | For dual connectivity operation, the SCG cell in which the UE performs random access when performing the Reconfiguration with Sync procedure. |
| priority | Logical channel priority, as specified in TS 38.321. an integer between 0 and 7. 0 means the highest priority and 7 means the lowest priority |
| PUCCH SCell | a Secondary Cell configured with PUCCH. |
| Radio Bearer | Logical path between a PDCP entity and upper layer (i.e. SDAP entity or RRC) |
| RLC bearer | RLC and MAC logical channel configuration of a radio bearer in one cell group. |
| RLC bearer configuration | The lower layer part of the radio bearer configuration comprising the RLC and logical channel configurations. |
| RX_DELIV | This state variable indicates the COUNT value of the first PDCP SDU not delivered to the upper layers, but still waited for. |
| RX_NEXT | This state variable indicates the COUNT value of the next PDCP SDU expected to be received. |
| RX_REORD | This state variable indicates the COUNT value following the COUNT value associated with the PDCP Data PDU which triggered t-Reordering. |
| Serving Cell | For a UE in RRC_CONNECTED not configured with CA/DC there is only one serving cell comprising of the primary cell. For a UE in RRC_CONNECTED configured with CA/ DC the term 'serving cells' is used to denote the set of cells comprising of the Special Cell(s) and all secondary cells. |
| SpCell | primary cell of a master or secondary cell group. |
| Special Cell | For Dual Connectivity operation the term Special Cell refers to the PCell of the MCG or the PSCell of the SCG, otherwise the term Special Cell refers to the PCell. |
| SRB | Signalling Radio Bearers" (SRBs) are defined as Radio Bearers (RBs) that are used only for the transmission of RRC and NAS messages. |
| SRB0 | SRB0 is for RRC messages using the CCCH logical channel |
| SRB1 | SRB1 is for RRC messages (which may include a piggybacked NAS message) as well as for NAS messages prior to the establishment of SRB2, all using DCCH logical channel; |
| SRB2 | SRB2 is for NAS messages and for RRC messages which include logged measurement information, all using DCCH logical channel. SRB2 has a lower priority than SRB1 and may be configured by the network after AS security activation; |
| SRB3 | SRB3 is for specific RRC messages when UE is in (NG)EN-DC or NR-DC, all using DCCH logical channel |
| SRB4 | SRB4 is for RRC messages which include application layer measurement reporting information, all using DCCH logical channel. |
| Suitable cell | A cell on which a UE may camp. Following criteria apply The cell is part of either the selected PLMN or the registered PLMN or PLMN of the Equivalent PLMN list The cell is not barred The cell is part of at least one TA that is not part of the list of "Forbidden Tracking Areas for Roaming" (TS 22.011 [18]), which belongs to a PLMN that fulfils the first bullet above. The cell selection criterion S is fulfilled (i.e. RSRP and RSRQ are better than specific values |

In the present invention, "trigger" or "triggered" and "initiate" or "initiated" may be used in the same meaning.

In the present invention, "radio bearers allowed for the second resume procedure", "radio bearers for which the second resume procedure is set", and "radio bearers for which the second resume procedure is enabled" may all have the same meaning.

FIG. 1A is a diagram illustrating the architecture of an 5G system and a NG-RAN to which the disclosure may be applied.

5G system consists of NG-RAN 1A-01 and 5GC 1A-02. An NG-RAN node is either:
 a gNB, providing NR user plane and control plane protocol terminations towards the UE; or
 an ng-eNB, providing E-UTRA user plane and control plane protocol terminations towards the UE.

The gNBs 1A-05 or 1A-06 and ng-eNBs 1A-03 or 1A-04 are interconnected with each other by means of the Xn interface. The gNBs and ng-eNBs are also connected by means of the NG interfaces to the 5GC, more specifically to the AMF Access and Mobility Management Function) and to the UPF (User Plane Function). AMF 1A-07 and UPF 1A-08 may be realized as a physical node or as separate physical nodes.

A gNB 1A-05 or 1A-06 or an ng-eNBs 1A-03 or 1A-04 hosts the functions listed below.
 Functions for Radio Resource Management such as Radio Bearer Control, Radio Admission Control, Connection Mobility Control, Dynamic allocation of resources to UEs in uplink, downlink and sidelink (scheduling); and
 IP and Ethernet header compression, uplink data decompression and encryption of user data stream; and Selection of an AMF at UE attachment when no routing to an MME can be determined from the information provided by the UE; and Routing of User Plane data towards UPF; and Scheduling and transmission of paging messages; and Scheduling and transmission of broadcast information (originated from the AMF or O&M); and Measurement and measurement reporting configuration for mobility and scheduling; and Session Management; and QoS Flow management and mapping to data radio bearers; and Support of UEs in RRC_INACTIVE state; and Radio access network sharing; and Tight interworking between NR and E-UTRA; and Support of Network Slicing.

The AMF 1A-07 hosts the functions such as NAS signaling, NAS signaling security, AS security control, SMF selection, Authentication, Mobility management and positioning management.

The UPF 1A-08 hosts the functions such as packet routing and forwarding, transport level packet marking in the uplink, QoS handling and the downlink, mobility anchoring for mobility etc.

Figure 1B:
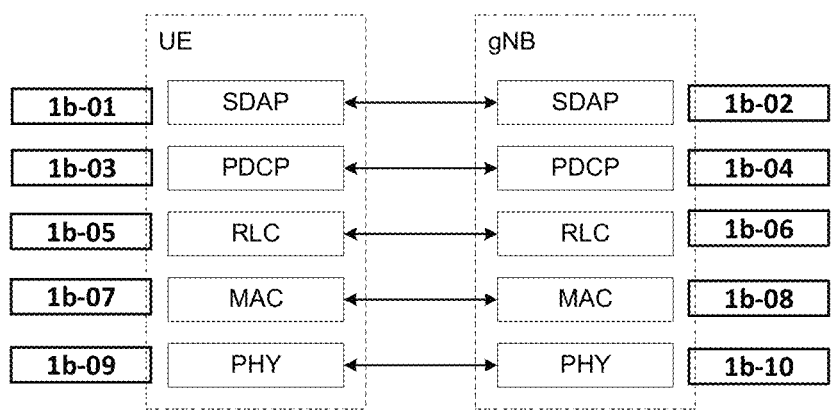
FIG. 1B is a diagram illustrating a wireless protocol architecture in an 5G system.
Figure 1B:
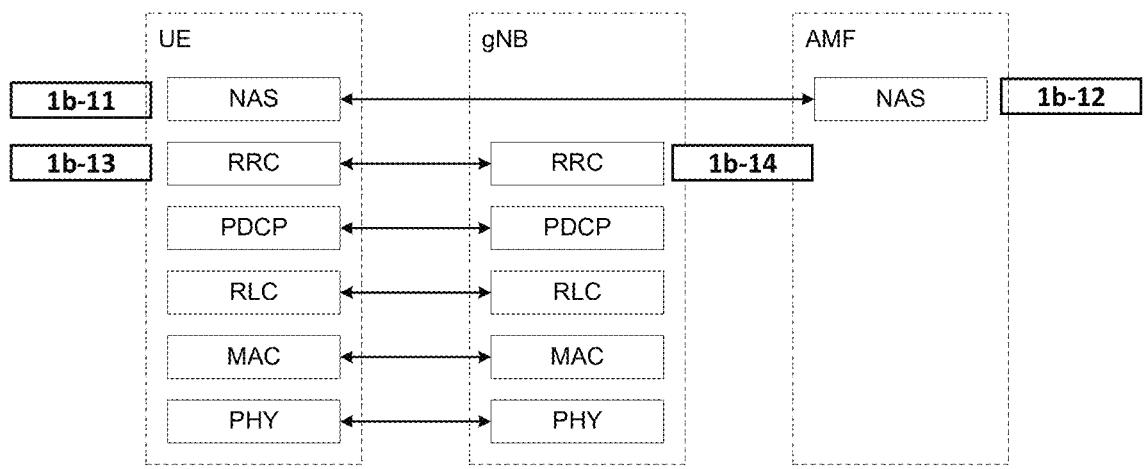

FIG. 1B is a diagram illustrating a wireless protocol architecture in an 5G system to which the disclosure may be applied.

User plane protocol stack consists of SDAP 1B-01 or 1B-02, PDCP 1B-03 or 1B-04, RLC 1B-05 or 1B-06, MAC 1B-07 or 1B-08 and PHY 1B-09 or 1B-10. Control plane protocol stack consists of NAS 1B-11 or 1B-15, RRC 1B-13 or 1B-14, PDCP, RLC, MAC and PHY.

Each protocol sublayer performs functions related to the operations listed in the table 3.

TABLE 3

| Sublayer | Functions |
|---|---|
| NAS | authentication, mobility management, security control etc |
| RRC | System Information, Paging, Establishment, maintenance and release of an RRC connection, Security functions, Establishment, configuration, maintenance and release of Signalling Radio Bearers (SRBs) and Data Radio Bearers (DRBs), Mobility, QoS management, Detection of and recovery from radio link failure, NAS message transfer etc. |
| SDAP | Mapping between a QoS flow and a data radio bearer, Marking QoS flow ID (QFI) in both DL and UL packets. |
| PDCP | Transfer of data, Header compression and decompression, Ciphering and deciphering, Integrity protection and integrity verification, Duplication, Reordering and in-order delivery, Out-of-order delivery etc. |
| RLC | Transfer of upper layer PDUs, Error Correction through ARQ, Segmentation and re-segmentation of RLC SDUs, Reassembly of SDU, RLC re-establishment etc. |
| MAC | Mapping between logical channels and transport channels, Multiplexing/demultiplexing of MAC SDUs belonging to one or different logical channels into/from transport blocks (TB) delivered to/from the physical layer on transport channels, Scheduling information reporting, Priority handling between UEs, Priority handling between logical channels of one UE etc. |
| PHY | Channel coding, Physical-layer hybrid-ARQ processing, Rate matching, Scrambling, Modulation, Layer mapping, Downlink Control Information, Uplink Control Information etc. |

Figure 1C:
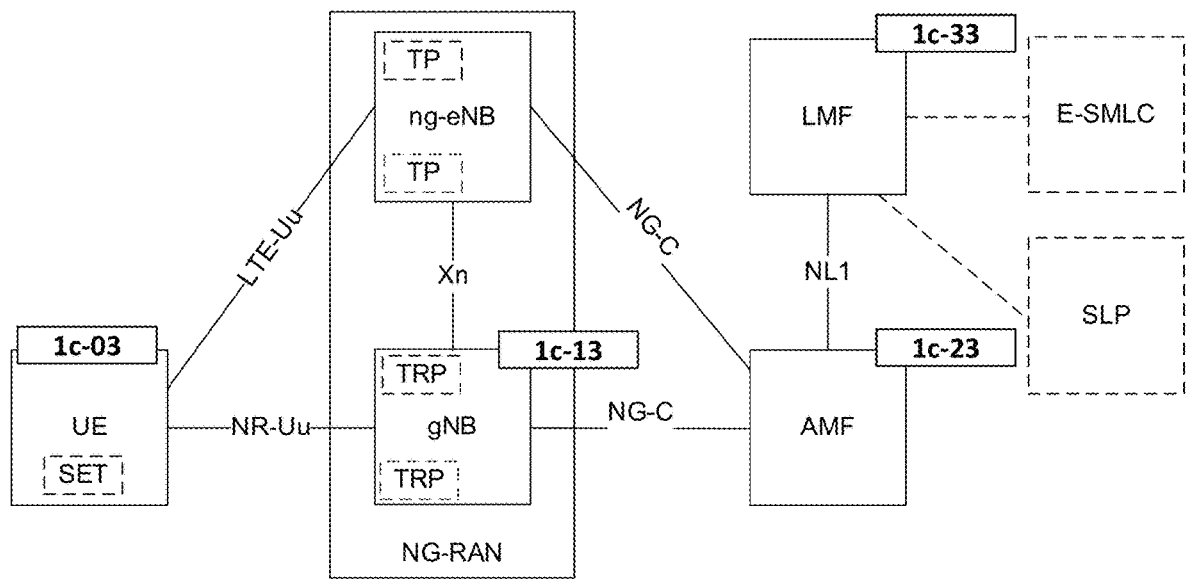
FIG. 1C is a diagram illustrating the architecture of positioning system.

FIG. 1C is a diagram illustrating a structure of a positioning system according to an embodiment of the present disclosure.

The terminal 1C-03 is connected to the LMIF 1C-33 through the gNB 1C-13 and the AMVF 1C-23. Hereinafter, gNB is also referred to as a base station, AMVF as an access mobility function, and LMF as a location management function.

The base station provides the TRP function. AMF stores the capability of the terminal related to location confirmation and relays the signaling between the location management function and the terminal. AMF may be connected to several base stations. One AMF can be connected to several LMFs. The AMF may initially select the LMF for any terminal. The AMF may select another LMF when the terminal moves to a new cell.

The LMF manages the support of different location services for target UEs, including positioning of UEs and delivery of assistance data to UEs.

The LMF may interact with a target UE in order to deliver assistance data if requested for a particular location service, or to obtain a location estimate if that was requested.

For positioning of a target UE, the LMF decides on the position methods to be used.

The positioning methods may yield a location estimate for UE-based position methods and/or positioning measurements for UE-assisted and network-based position methods. The LMF may combine all the received results and determine a single location estimate for the target UE (hybrid positioning). Additional information like accuracy of the location estimate and velocity may also be determined.

Figure 1D:
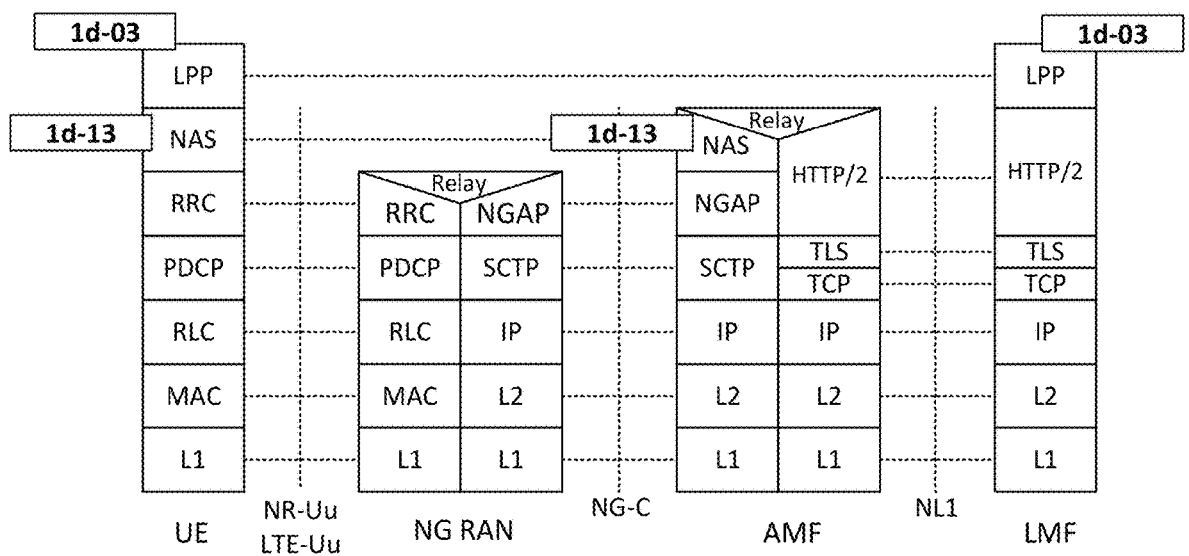
FIG. 1D is a diagram illustrating the protocol architecture of positioning system.

FIG. 1D is a diagram illustrating a protocol hierarchical structure for signaling between a location management function and a terminal according to an embodiment of the present disclosure.

The terminal and LMF exchange signaling through LPP 1D-03. LPP defines various control messages related to positioning. The LPP control message is included in the NAS 1D-13 message and delivered to the AMF, and the AMF delivers the LPP control message included in the NAS message to the LMF.

LPP is a protocol applied to both LTE and NR. Hereinafter, LPP is also called positioning protocol.

FIG. 2A shows the types of positioning method.

Positioning methods include GNSS positioning 2A-01, OTDOA positioning 2A-05, Barometric pressure sensor positioning 2A-03, Downlink Time Difference of Arrival DL-AOD positioning 2A-07, Downlink Angle-of-Departure (DL-TDOA) positioning 2A-09, and Uplink Time Difference of Arrival (UL-TDOA) positioning 2A-11.

GNSS positioning and barometric pressure sensor positioning are positioning methods independent of radio access technology, OTDOA positioning is a positioning method using an LTE downlink signal, and DL-AoD positioning and DL-TDOA positioning are positioning methods using a specific NR downlink signal. The specific NR downlink signal is a positioning reference signal (PRS). UL-TDOA positioning is a positioning method using a specific NR uplink signal. The specific NR uplink signal is a sounding reference signal (SRS).

FIG. 2B is a diagram illustrating positioning assistance data.

Assistance data may be transmitted to the positioning device so that each positioning can be performed more quickly and accurately. The assistance data may be provided through system information or transmitted through an LPP message. The positioning device may be a terminal or a base station.

Assistance data is transmitted while being included in assistanceDataElement (assitanceDataElement). One assitanceDataElement contains specific information related to a specific positioning method. For example, GNSS-ReferenceTime assitanceDataElement includes reference time information of GNSS and is transmitted through the positioning SIB called posSibType1-1 or delivered to the terminal through the LPP control message called ProvideAssistanceData. When provided through the positioning SIB, assitanceDataElement is mapped to a specific positioning SIB type. GNSS-related assitanceDataElements 2B-01 to 2B-03 are mapped to positioning SIB type 1 and positioning SIB type 2. OTDOA-related assitanceDataElement 2B-05 is mapped to positioning SIB type 3, barometric pressure sensor positioning-related assistanceDataElement 2B-07 is mapped to positioning SIB type 4, and DL-AoD and DL-TDOA-related assistanceDataElement 2B-11 are mapped with positioning SIB type 6. Most of the assistanceDataElements are immediately applicable upon receipt. However, specific information, such as PRS-related assistance data, can be divided into those that are immediately applicable and those that are applicable when a predetermined condition is met that are transmitted through the SIB. For example, NR-DL-PRS-AssistanceData 2B-13 includes assistance data that is applied immediately, and NR-DL-PRS-ConditionalAssistanceData 2B-15 includes assistance data that is applied when a predetermined condition is satisfied or is selectively applied.

Assistance data immediately applicable is called type 1 assistance data, and assistance data applicable when predetermined conditions are met is called type 2 assistance data.

Figure 2C:
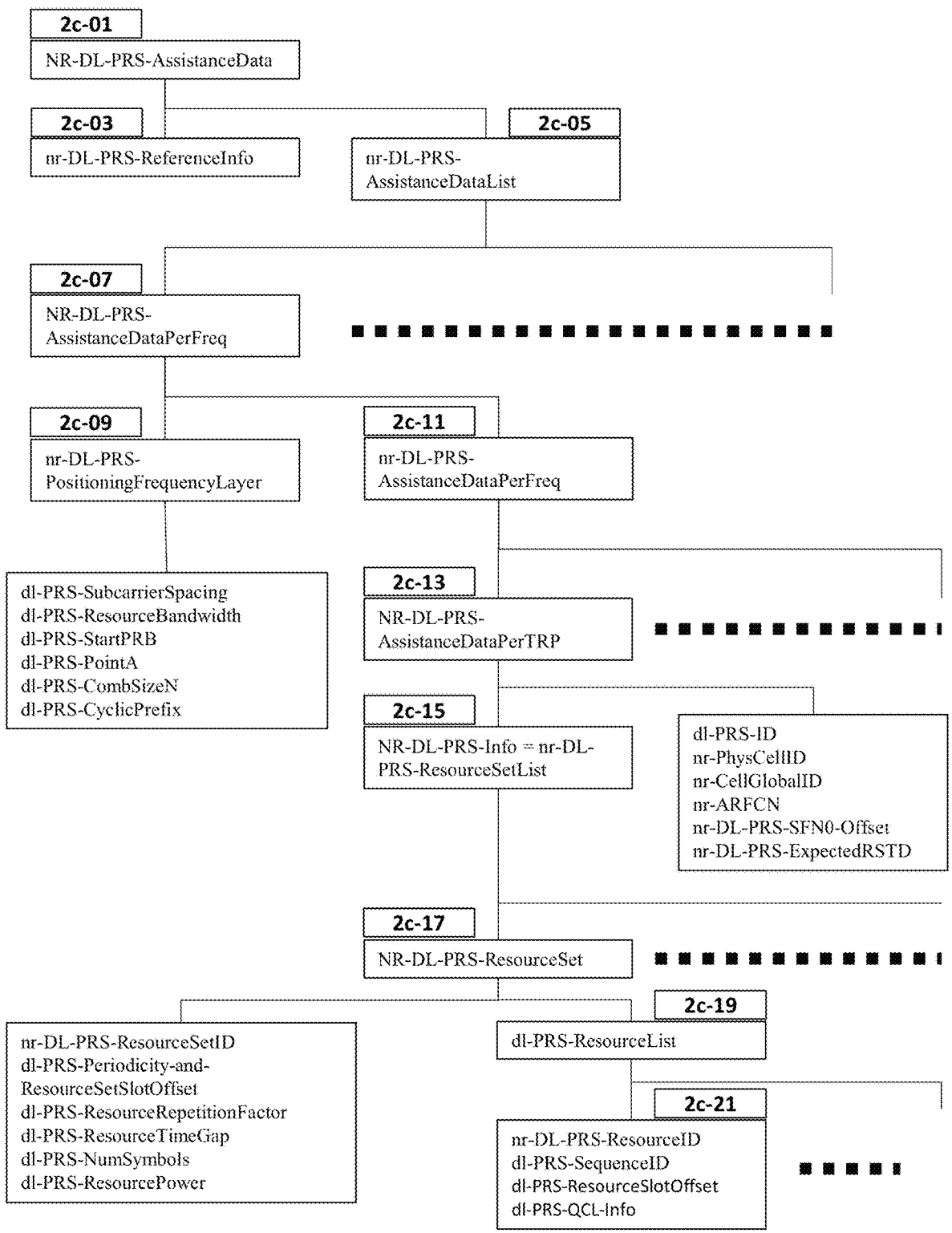
FIG. 2C is a diagram illustrating a structure of immediate downlink positioning reference signal assistance data according to the first embodiment of the present invention.

FIG. 2C is a diagram illustrating the structure of NR-DL-PRS-AssistanceData.

Definitions of each type of IEs used in FIG. 2C follow specification 37.355, unless otherwise defined.

NR-DL-PRS-AssistanceData provides information on PRS as assistance data for DL-TDOA or DL-AOD. NR-DL-PRS-AssistanceData is provided to the terminal through positioning SIB type 6-1 or through ProvideAssistanceData.

One NR-DL-PRS-AssistanceData 2C-01 is composed of one nr-DL-PRS-ReferenceInfo 2C-03 and one nr-DL-PRS-AssistanceDataList 2C-05.

The nr-DL-PRS-ReferenceInfo 2C-03 provides information on the identifier and frequency of the TRP that provides a reference for nr-DL-PRS-SFN0-Offset or dl-PRS-ResourceSlotOffset, etc.

The nr-DL-PRS-AssistanceDataList 2C-05 is composed of a plurality of NR-DL-PRS-AssistanceDataPerFreq 2C-07. One NR-DL-PRS-AssistanceDataPerFreq 2C-07 provides information on PRS provided at a specific frequency, and is composed of nr-DL-PRS-PositioningFrequencyLayer 2C-09 and nr-DL-PRS-AssistanceDataPerFreq 2C-11. NR-DL-PRS-AssistanceDataPerFreq 2C-07 and nr-DL-PRS-AssistanceDataPerFreq 2C-11 are different IEs.

The nr-DL-PRS-AssistanceDataPerFreq 2C-11 is composed of a plurality of NR-DL-PRS-AssistanceDataPerTRP 2C-13. The nr-DL-PRS-PositioningFrequencyLayer 2C-09 is common information applied to a plurality of NR-DL-PRS-AssistanceDataPerTRP 2C-13. This is composed of information such as the subcarrier spacing, the bandwidth of the PRS resource, the PRB from which the PRS resource starts. One NR-DL-PRS-AssistanceDataPerTRP 2C-13 provides information on PRS provided by a specific TRP. TRP may be a cell.

NR-DL-PRS-AssistanceDataPerTRP 2C-13 consists of information commonly applied to multiple nr-DL-PRS-ResourceSet 2C-17 and multiple nr-DL-PRS-ResourceSet 2C-17. The Information commonly applied to the plurality of nr-DL-PRS-ResourceSets 2C-17 includes dl-PRS-ID, a cell identifier corresponding to the TRP and the time offset of the SFN #0 slot #0 for the given TRP with respect to SFN #0 slot #0 of the assistance data reference.

One nr-DL-PRS-ResourceSet 2C-17 consists of one dl-PRS-ResourceList 2C-19, and dl-PRS-ResourceList 2C-19 consists of a plurality of dl-PRS-Resources.

One dl-PRS-Resource has an identifier, code sequence information applied to the corresponding PRS, and the starting slot of the DL-PRS Resource with respect to the corresponding DL-PRS-Resource Set Slot Offset and QCL information (beam information) of the corresponding PRS.

The PRS-ResourceSet is composed of a plurality of PRSs using the same frequency resource, and is a set of PRS resources grouped for beam sweeping.

Consequently, one nr-DL-PRS-AssistanceDataList 2C-05 includes assistance data for a plurality of frequencies. The assistance data for each frequency includes assistance data for a plurality of TRPs. The assistance data for each TRP may provide information on a plurality of DL-PRS-ResourceSets. One DL-PRS-ResourceSet is composed of a plurality of DL-PRS-Resources. The terminal may perform positioning measurement by measuring the plurality of DL-PRS-Resources indicated in the nr-DL-PRS-AssistanceDataList 2C-05.

NR-DL-PRS-AssistanceData is assistance data that is applied immediately. DL-PRS included in NR-DL-PRS-AssistanceData are continuously transmitted from the time point when the terminal receives NR-DL-PRS-AssistanceData until the terminal stops measuring positioning using DL-PRS, and the terminal immediately use the immediately applied assistance data when positioning measurement using the assistance data is necessary.

Figure 2D:
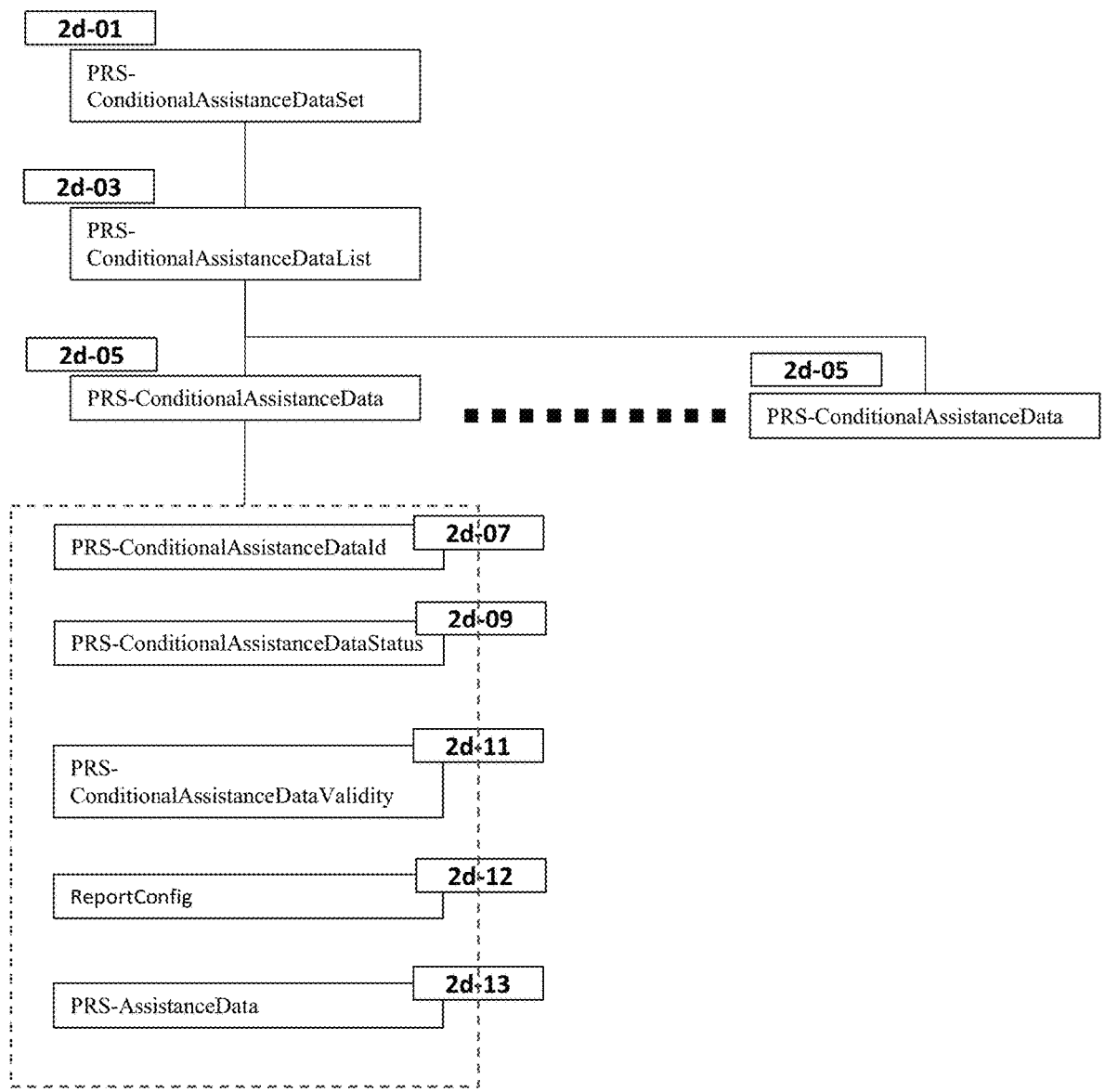
FIG. 2D is a diagram illustrating a structure of conditional downlink positioning reference signal assistance data according to the first embodiment of the present invention.

FIG. 2D is a diagram illustrating the structure of PRS-ConditionalAssistanceData.

The PRS-ConditionalAssistanceDataSet (hereinafter, conditional assistance data set) 2D-01 is composed of a PRS-ConditionalAssistanceDataList 2D-03 including a plurality of PRS-ConditioanlAssistanceData 2D-05 (hereinafter, conditional assistance data). Each conditional assistance data 2D-05 includes PRS-AssistanceData 2D-13 (hereinafter, assistance data) that is currently being transmitted or that can be started when a terminal requests it.

The conditional assistance data set includes type 2 assistance data and is provided to the terminal through positioning SIB type 6-4 or through ProvideAssistanceData. Positioning SIB type 6-1 includes only one type 1 assistance data 2C-01, and positioning SIB type 6-4 includes one or more type 2 assistance data 2D-13. conditional assistance data 2D-05 is composed of PRS-ConditionalAssistanceDataId 2D-07 (hereinafter assistance data id), PRS-ConditionalAssistanceDataStatus 2D-09 (hereinafter assistance data status), PRS-ConditionalAssistanceDataValidity 2D-11 (assistance data validity), ReportConfig (hereinafter, Report Configuration), and PRS-AssistanceData 2D-13 (hereinafter, assistance data).

The assistance data id 2D-07 is an identifier of the related conditional assistance data 2D-05 or the related assistance data 2D-13 and is an integer between 0 and 15.

The assistance data status 2D-09 is 1-bit information indicating whether the related assistance data 2D-13 is being transmitted (or provided). That the assistance data 2D-13 is being transmitted means that the PRSs specified in the assistance data 2D-13 are currently being transmitted. If the assistance data status related to the assistance data exists (or the assistance data status is set to the first value), the terminal determines that the PRSs specified in the assistance data are currently being transmitted and performs the necessary operation. If the assistance data status related to the assistance data does not exist (or if the assistance data status is set to the second value), the terminal determines that the PRSs specified in the assistance data are not currently being transmitted. The terminal, if necessary, requests the LMF to start transmission of the PRS.

The assistance data validity 2D-11 indicates under what conditions the relevant conditional assistance data 2D-05 or the relevant assistance data 2D-13 are valid. Alternatively, the assistance data validity indicates which conditions to be fulfilled for UE to initiate measurement on the relevant PRS and to report measurement results. The assistance data validity 2D-11 may include an NR CGI (Cell Global Identifier) List or time interval information. The time interval information is composed of the first time point and the second time point. In the terminal, if the NR CGI of the current cell belongs to the NR CGI List, and the current time expressed in UTC (Universal Coordinate Time) belongs to the time interval information expressed in the first time point and the second time point, the related conditional assistance data 2D-05 or related assistance data 2D-13 is considered valid. If the assistance data status 2D-09 of the conditional assistance data 2D-05 determined to be valid is set to 'available', 'transmit' or 'broadcast', the terminal performs positioning measurement for the related PRS and report measurement results to the LMF. If the assistance data status 2D-09 of the conditional assistance data 2D-05 determined to be valid is set to 'unavailable', 'not transmitted', or 'non-broadcast', the terminal requests LMF to activate the conditional assistance data 2D-05. Activation of the conditional assistance data means that the PRSs specified in the conditional assistance data are transmitted.

The conditional assistance data set 2D-01 may be provided through a positioning SIB or may be provided through an LPP control message. The assistance data status 2D-09 is included only in the conditional assistance data set 2D-01 provided through the positioning SIB, and the assistance data validity is included only in the conditional assistance data set provided through the LPP control message. Alternatively, assistance data status is used only for type 2 assistance data provided through positioning SIB, and assistance data validity is used only for type 2 assistance data provided through AssistanceDataProvide.

ReportConfig 2D-12 (hereinafter Report Configuration) is parameters related to positioning measurement result reporting and consists of maxDL-PRS-RSTD-MeasurementsPer-TRPPair and timingReportingGranularityFactor. maxDL-PRS-RSTD-MeasurementsPerTRPPair indicates the maximum number of. DL-PRS RSTD measurements for downlink PRS RSTD (Reference Signal Time Difference). timingReportingGranularityFactor indicates recommended reporting granularity for the DL RSTD measurements.

The terminal reports the measurement result according to the above ReportConfig when the validity condition of the conditional assistance data is met.

The assistance data 2D-13 of the conditional assistance data 2D-05 is an IE having the same structure as the PRS-AssistanceData 2C-01.

The conditional assistance data is classified into conditional assistance data1 received through the positioning SIB and conditional assistance data2 received through the LPP control message. The assistance data status IE is mandatorily present in conditional assistance data1, but not present in conditional assistance data2. The assistance data validity is mandatorily present in conditional assistance data2 but nor present in conditional assistance data1.

The purpose of conditional assistance data1 is to inform the terminal of PRSs in which transmission can be activated in the corresponding cell. The terminal may determine the PRSs required for its own positioning measurement among the PRSs indicated in conditional assistance data1, and may request the LMF to activate the corresponding conditional assistance data.

The purpose of conditional assistance data2 is to inform the terminal of PRSs to be measured when a predetermined condition is met. The terminal may measure the PRSs that satisfy the condition among the PRSs specified in conditional assistance data2 and report the results to the LMF.

Figure 2E:
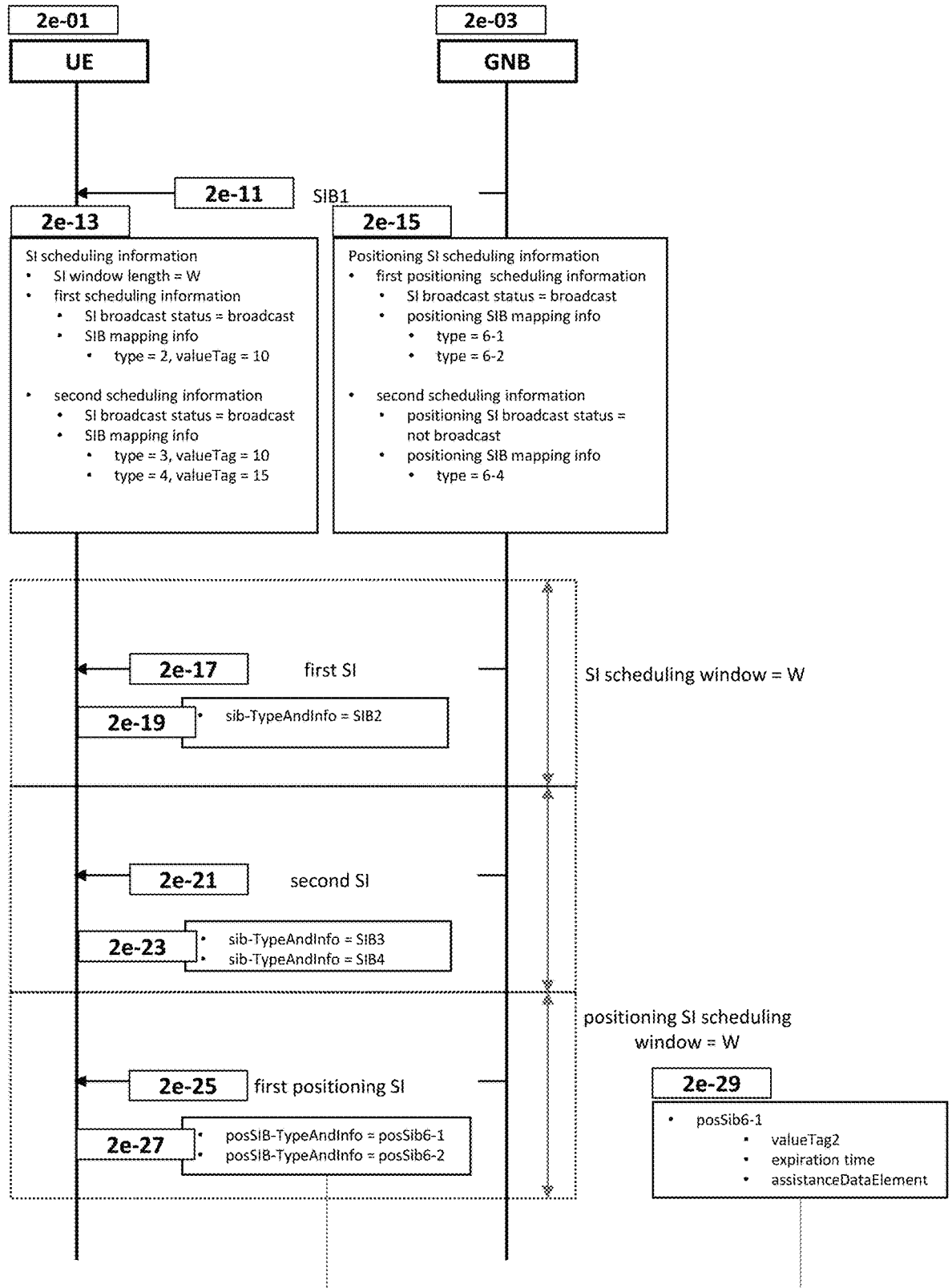
FIG. 2E is a diagram illustrating system information acquisition procedure according to the first embodiment of the present invention.

FIG. 2E is a diagram illustrating a system information acquisition process.

System Information Block (hereinafter referred to as SIB) includes general SIB and positioning SIB. Types of general SIB include SIB1, SIB2, SIB3, SIB4, SIB5, SIB6, SIB7, SIB8, and SIB9. SIB1 includes information related to scheduling of other system information and radio resource configuration information commonly applied to all terminals. SIB2 includes cell reselection information. SIB3 includes information about neighboring cells for intra-frequency cell resection. SIB4 includes information for inter-frequency cell resection. SIB5 includes E-UTRA frequency information and the like for inter-RAT cell reselection. SIB6 includes ETWS (Earthquake Tsunami Warning System) main notification. SIB7 includes the ETWS sub-notification. SIB8 contains CMAS notifications. SIB9 includes information related to GPS time and Coordinated Universal Time (UTC).

The types of positioning SIBs and their mapped assistance data are shown in FIG. 2B.

One or more SIBs with the same transmission period are transmitted in a single System Information (SI). The scheduling information of SI related to general SIB is indicated in SI scheduling information. The scheduling information of the SI related to the positioning SIB is indicated in the positioning SI scheduling information. SI scheduling information and positioning SI scheduling information are included in SIB1.

The SI scheduling information includes one or more scheduling information and one SI window length. The scheduling information consists of SI broadcast status, SI periodicity, and SIB mapping information. SI broadcast status indicates whether the corresponding SI message is being broadcast. SI periodicity is the period of the corresponding SI message. The SI window length is the length of the SI scheduling window. The SIB mapping information consists of one or a plurality of SIB type information. The SIB type information includes type information indicating one of sibType2, sibType3, sibType4, sibType5, sibType6, sibType7, sibType8, sibType9, sibType10, sibType11, sibType12, sibType13, and sibType14, and a value tag indicating one of integers between 0 and 31.

The positioning SI scheduling information is composed of one or more positioning scheduling information and the like. The positioning scheduling information consists of positioning SI broadcast status, positioning SI periodicity, and positioning SIB mapping information. The positioning SI broadcast status indicates whether the corresponding positioning SI message is being broadcast. The positioning SI periodicity is the period of the positioning SI message. The positioning SIB mapping information consists of one or a plurality of positioning SIB type information. positioning SIB type information consist of a type information indicating one of posSibType1-1, posSibType1-2, posSibType1-3, posSibType1-4, posSibType1-5, posSibType1-6, posSibType1-7, posSibType1-8, posSibType2-1, posSibType2-2, posSibType2-3, posSibType2-4, posSibType2-5, posSibType2-6, posSibType2-7, posSibType2-8, posSibType2-9, posSibType2-10, posSibType2-11, posSibType2-12, posSibType2-13, posSibType2-14, posSibType2-15, posSib- Type2, posSibType2-17, posSibType2-18, posSibType2-19, posSibType2-20, posSibType2-21, posSibType2-22, posSibType2-23, posSibType3-1, posSibType4-1, posSibType5-1, posSibType6-1, posSibType6-2, posSibType6-2, posSibType6-3 and posSibType6-4.

In step 2E-11, the terminal 2E-01 receives SIB1 from the base station 2E-03.

SI scheduling information of SIB1 is set as in 2E-13. The positioning SI scheduling information of SIB1 is set as in 2E-15.

SI with SI broadcast status set to being broadcast and positioning SI with positioning SI broadcast status set to being broadcast are transmitted according to the order included in SI scheduling information and positioning SI scheduling information.

For example, it is transmitted in the order of the first SI, the second SI, and the first positioning SI.

SI and positioning SI are transmitted within the SI scheduling window and the positioning SI scheduling window. The length of the SI scheduling window and the length of the positioning SI scheduling window are determined by the SI window length of SI scheduling information.

In step 2E-17, the terminal receives the first SI in the SI scheduling window for the first SI. The first SI contains only SIB2 as shown in 2E-13. As shown in 2E-19, the first SI includes one IE called sib-TypeAndInfo, and sib-TypeAndInfo includes SIB2.

In step 2E-21, the terminal receives the second SI in the SI scheduling window for the second SI. The second SI denotes SIB3 and SIB4 as shown in 2E-13. As shown in 2E-23, the second SI includes two sib-TypeAndInfo IEs, the first sib-TypeAndInfo includes SIB3, and the second sib-TypeAndInfo includes SIB4.

In step 2E-25, the terminal receives the first positioning SI in the positioning SI scheduling window for the first positioning SI. The first positioning SI includes positioning SIB 6-1 and positioning SIB 6-2 as shown in 2E-15. As shown in 2E-27, the first positioning SI includes two posSIB-TypeAndInfo IEs, the first posSIB-TypeAndInfo includes positioning SIB6-1, and the second posSIB-TypeAndInfo includes positioning SIB6-2.

As shown in 2E-29, one positioning SIB is composed of value tag2, expiration time, and assistanceDataElement. value tag2 indicates one of integers between 0 and 63 and indicates whether broadcast assistance data has been changed. value tag2 is set by LMF. The expiration time indicates the time point at which the contents of the broadcast assistance data expire in UTC. assistanceDataElement is a field containing actual assistance data.

Change of general SIB is indicated by a value tag that indicates one of the integers between 0 and 31 set by the base station. Change of the positioning SIB is indicated by a value tag2 that indicates one of the integers between 0 and 63 set by the LMF. Value tag is broadcasted as included in SIB1, and value tag2 is broadcasted as included in positioning SI.

As shown in 2E-15, the second positioning scheduling information is not broadcasted. The terminal performs a system information request procedure to receive non-broadcast positioning scheduling information.

The terminal should always store valid system information. The terminal maintains the validity of the system information by reacquiring the system information when a predetermined event occurs.

When the short message included in the DCI addressed to the P-RNTI indicates systemInfoModification, the terminal receives SIB1, determines the first type SIBs in which the value tag is changed, and receive the first type SIBs in which the value tag is changed and store it. The terminal receives and stores positioning SIs including the second type SIB again without considering the value tag. First type SIB is a general SIB, and second type SIB is a positioning SIB.

When 3 hours have elapsed since the terminal successfully received the first type SIB, the terminal discards the first type SIB and initiates a procedure for acquiring the SI including the first type SIB.

When the terminal successfully receives the second type SIB, it stores the second type SIB. Then, in a systemInfoModification period starting just before the expiration time of the second type SIB, terminal starts a procedure for acquiring the SI including the second type.

The systemInfoModification period is a time interval that occurs sequentially. During one systemInfoModification period, system information cannot be changed. When it is necessary to change the system information, the base station transmits new system information from the time point at which the next systemInfoModification period starts.

Figure 2F:
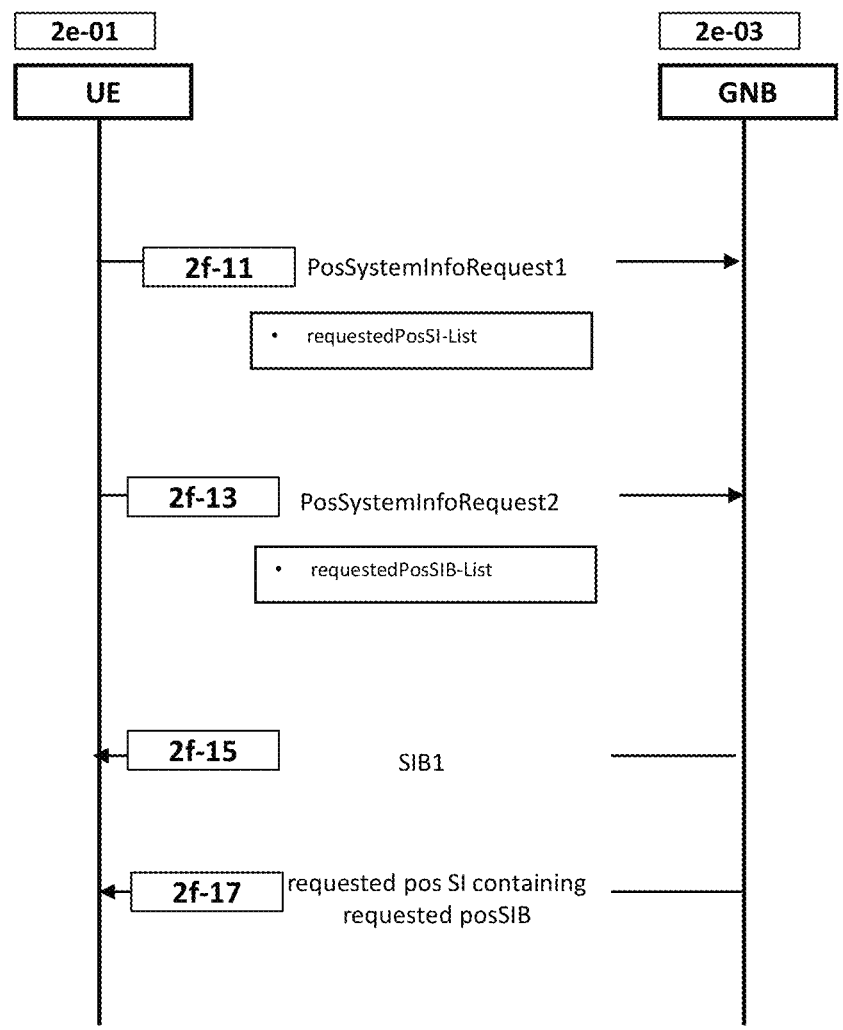
FIG. 2F is a diagram illustrating system information request procedure according to the first embodiment of the present invention.

FIG. 2F is a diagram illustrating a system information request procedure.

The terminal can request system information that is not broadcast by using the RRC control message. The terminal in terminal in RRC_IDLE or in terminal in RRC_INACTIVE transmits positioning system information request1, and the terminal in RRC_CONNECTED state transmits positioning system information request2.

In step 2F-11, the terminal in RRC_IDLE or terminal in RRC_INACTIVE transmits positioning system information request1, which is an RRC control message for requesting positioning system information, to the base station. The positioning system information request1 includes the requested positioning SI list. The requested positioning SI list is a list of SI messages requested by the terminal to be provided to the base station. The requested SI list is a 32-bit bitmap. Each bit of the requested positioning SI list corresponds to each entry according to the order of the entries included in the positioning SI scheduling information. For example, the first bit corresponds to the first positioning SI of the positioning SI scheduling information.

In step 2F-13, the terminal in RRC_CONNECTED transmits positioning system information request2, which is an RRC control message for requesting positioning system information, to the base station. The positioning system information request2 includes the requested positioning SIB list. The requested positioning SIB list is a list of positioning SIBs requested by the terminal to be provided to the base station, and includes a plurality of positioning SIB type information. The positioning SIB type information indicates the type of positioning SIB requested by the terminal.

In step 2F-15, the terminal that has transmitted the positioning system information request1 or positioning system information request2 receives SIB1 from the base station. The terminal checks whether the requested positioning SI or SI including the positioning SIB is broadcast.

In step 2F-17, the terminal receives the positioning SI requested by the terminal or the positioning SI including the positioning SIB requested by the terminal.

Positioning system information request1 is transmitted via SRB0 and CCCH. The positioning system information request2 is transmitted via SRB1 and DCCH. Since the size of the control message transmitted through the CCCH is limited, positioning system information request1 reduces the size of transmitted information by indicating the requested SI type information in a bitmap format instead of directly indicating it. On the other hand, since a relatively large message can be transmitted through the DCCH, the positioning system information request2 directly indicates the requested positioning SIB.

Figure 2G:
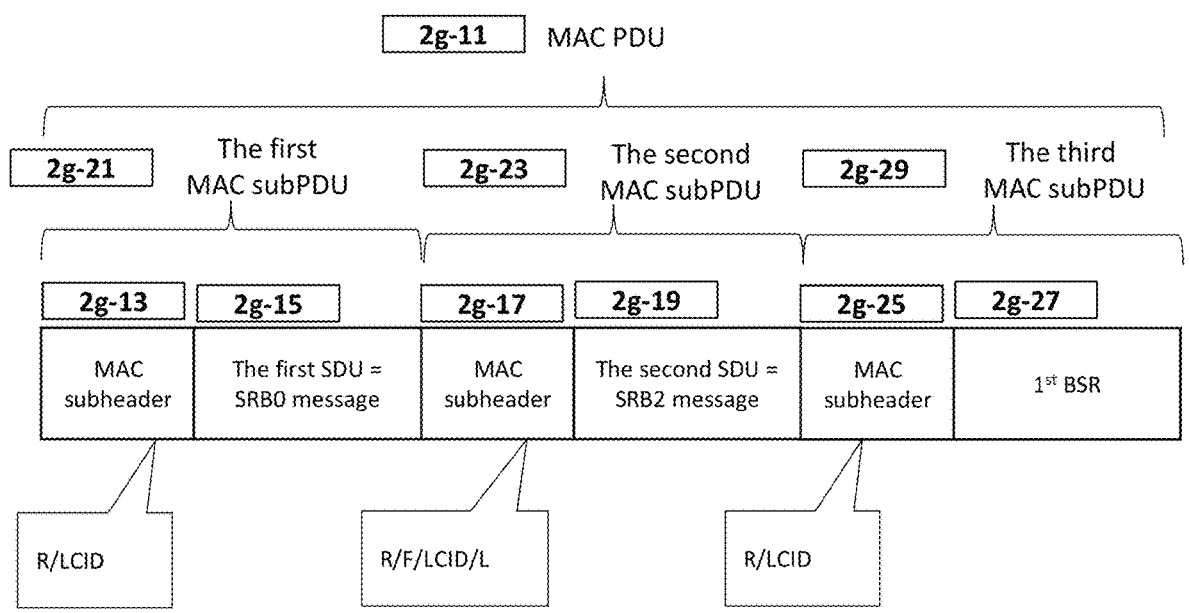
FIG. 2G is a diagram illustrating structures of an uplink MAC PDU including positioning measurement result in RRC_INACTIVE.

FIG. 2G is a diagram illustrating the structure of an uplink MAC PDU including an inactive positioning measurement result.

The uplink MAC PDU including the inactive positioning measurement result consists of three MAC subPDUs. The MAC SDU (the first SDU) 2G-15 including the ResumeRequest message belonging to SRB0 is located at the front of the MAC PDU 2G-11, and the MAC SDU (the second SDU) including the LPP segment message belonging to SRB2 (the second SDU) 2G-19 is located next. The first BSR 2G-27 is located at the rearmost part. That is, the first MAC subPDU including SRB0 data, the second MAC subPDU including SRB2 data, and the third MAC subPDU including the first BSR are included in the order. The MAC sub-header of the first MAC subPDU and the third MAC subPDU consists of two reserved bits and an LCID field. The MAC sub-header of the second MAC subPDU consists of one reserved bit, an F field, an LCID field, and an L field. This is so that the base station receiving the MAC PDU processes the ResumeRequest first, so that the MAC PDU is recognized as a MAC PDU related to the small data transfer procedure as quickly as possible. The remaining part 2G-15 excluding the MAC sub-header in the first MAC subPDU and the remaining part 2G-27 excluding the MAC sub-header in the third MAC subPDU are plain text that is not ciphered. In the second MAC subPDU, the remaining part 2G-19 except for the MAC sub-header includes data ciphered with a predetermined security key. The MAC sub-header is not ciphered. The reason for locating the MAC subPDUs as described above is that the first MAC subPDU and the second MAC subPDU include data processed by RRC, and the third MAC subPDU includes data processed by MAC, so it is to facilitate the processing operation of the terminal by locating the unciphered data first and locating the ciphered data later.

Figure 2H:
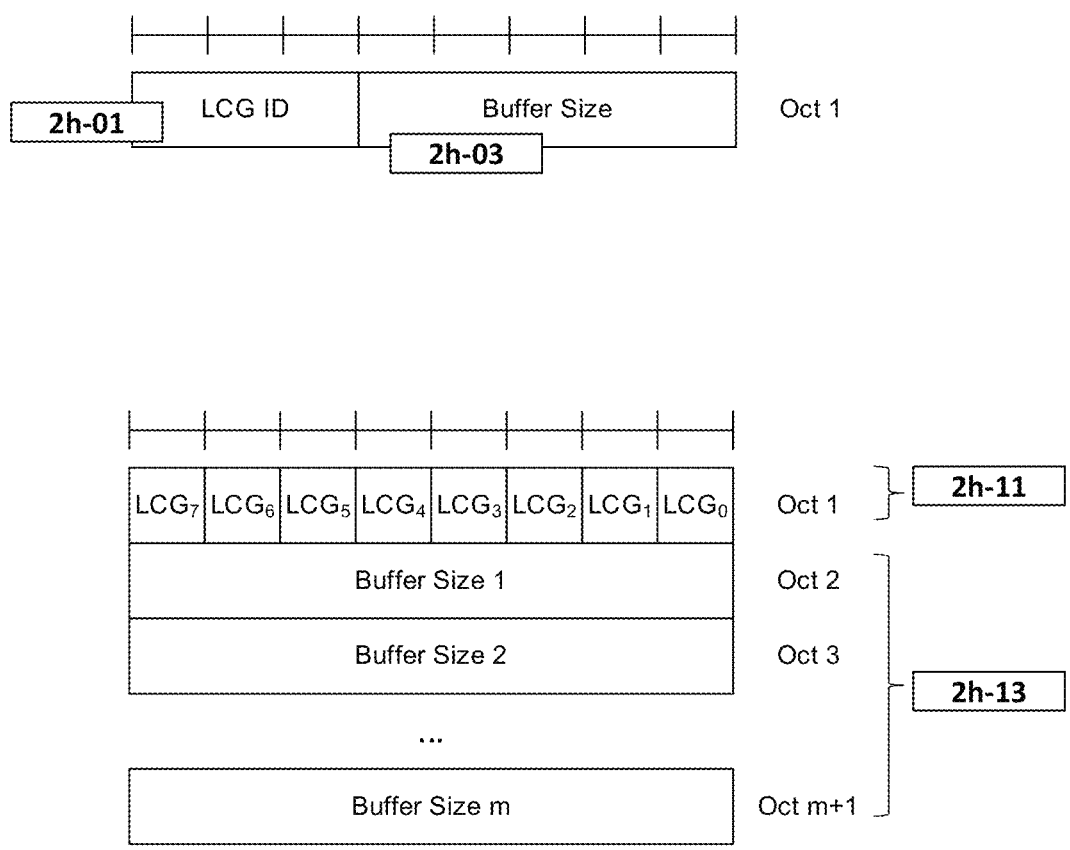
FIG. 2H is a diagram illustrating structures of a first buffer status report MAC CE and a second buffer status MAC CE.

FIG. 2H is a diagram illustrating the structure of a buffer status report MAC CE.

The first BSR MAC CE consists of one logical channel group identifier field 2H-01 and one first buffer size field 2H-03. The logical channel group identifier field 2H-01 has a 3-bit size and indicates one of the logical channel group identifiers between 0 and 7. The first buffer size field 2H-03 has a size of 5 bits and indicates one of the first buffer size indexes from 0 to 31. The first buffer size index 0 means that there is no data available for transmission in logical channels belonging to the corresponding logical channel group. The first buffer size index 31 means that the amount of data for transmission of the logical channels belonging to the corresponding logical channel group is greater than the 30th first buffer size. The first buffer size index 1 means that the amount of data for transmission of logical channels belonging to the corresponding logical channel group is greater than 0 and less than or equal to the first buffer size. The first buffer size index n ($2<=n<=30$) indicates that the amount of data for transmission of the logical channels belonging to the corresponding logical channel group is greater than the n−1st buffer size and less than or equal to the nth first buffer size. The 30 first buffer sizes are defined in the standard.

The second BSR MAC CE consists of 8 LCGi bits 2H-11 and a plurality of the second buffer size fields 2H-13. The LCGi bit indicates whether the second buffer size field for logical channel group i exists. For example, it indicates whether the second buffer size field for LCG1 logical channel group 1 exists. If this field is 1, the second buffer size field for the corresponding LCG exists. The second buffer size field has an 8-bit size and indicates one of the second buffer size indexes between 0 and 255. The second buffer size index 0 means that there is no data available for transmission in logical channels belonging to the corresponding logical channel group. The second buffer size index 254 means that the amount of data for transmission of the logical channels belonging to the corresponding logical channel group is greater than the size of the 253-th second buffer size. The second buffer size index 1 means that the amount of data for transmission of the logical channels belonging to the corresponding logical channel group is greater than 0 and less than or equal to the first second buffer size. The second buffer size index n ($2<=n<=253$) indicates that the amount of data for transmission of the logical channels belonging to the corresponding logical channel group is greater than the $(n-1)^{th}$ buffer size and less than or equal to the $n^{th}$ buffer size. The second buffer size index 255 is not used. The 252 second buffer sizes are defined in the specification.

The first BSR MAC CE is referred to as a BSR to which the first format is applied or the first format BSR. The second BSR MAC CE is referred to as a BSR to which the second format is applied or the second format BSR.

Logical channel group is configured when logical channel is configured. A logical channel and a logical channel group are configured with an RRC control message.

In general, a buffer size index reflecting the amount of data available for transmission of the RLC layer and the amount of data available for transmission of the PDCP layer is set in buffer size field.

Figure 3A:
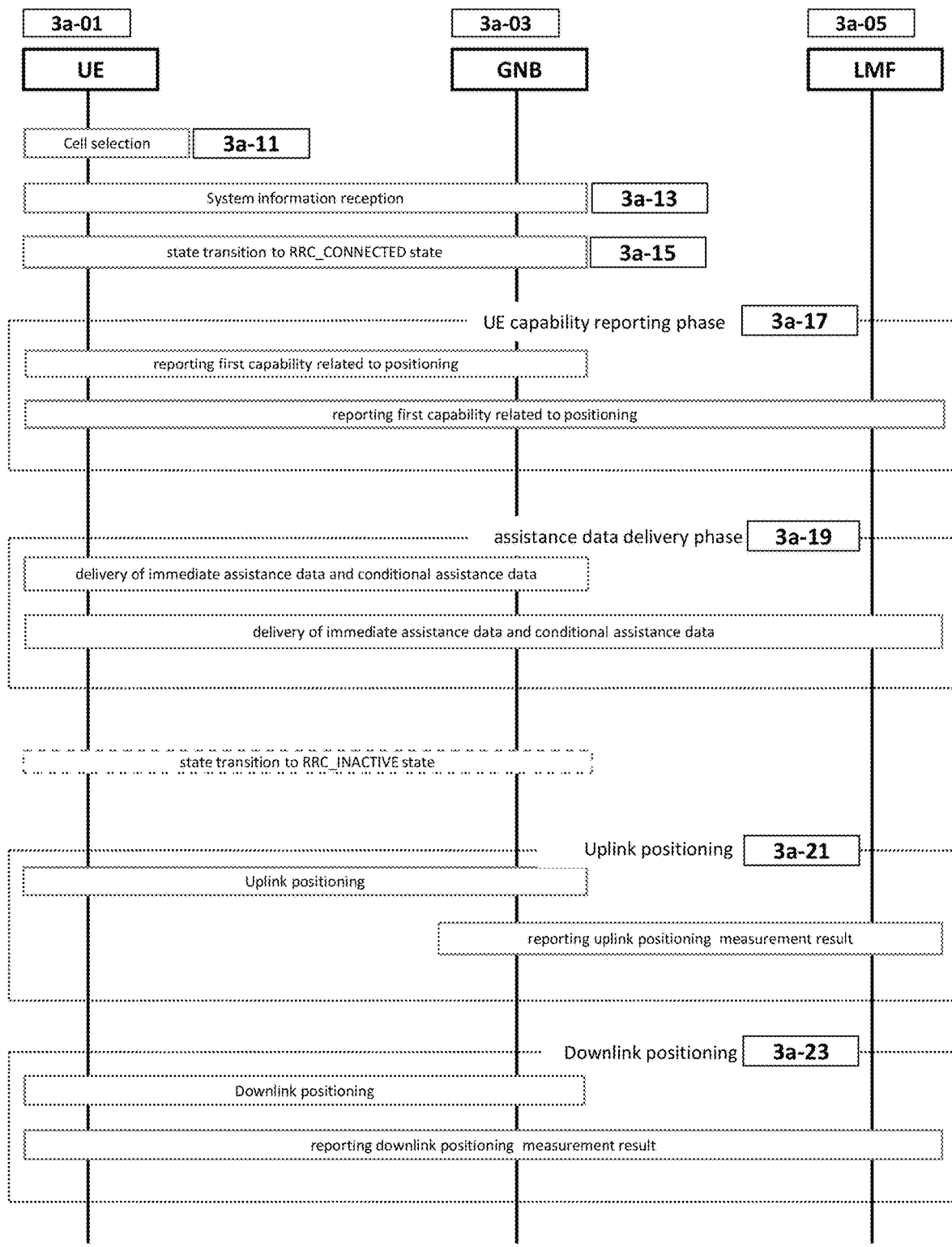
FIG. 3A is a flow diagram illustrating an operation of a terminal and a base station and an LMF.
Figure 3B:
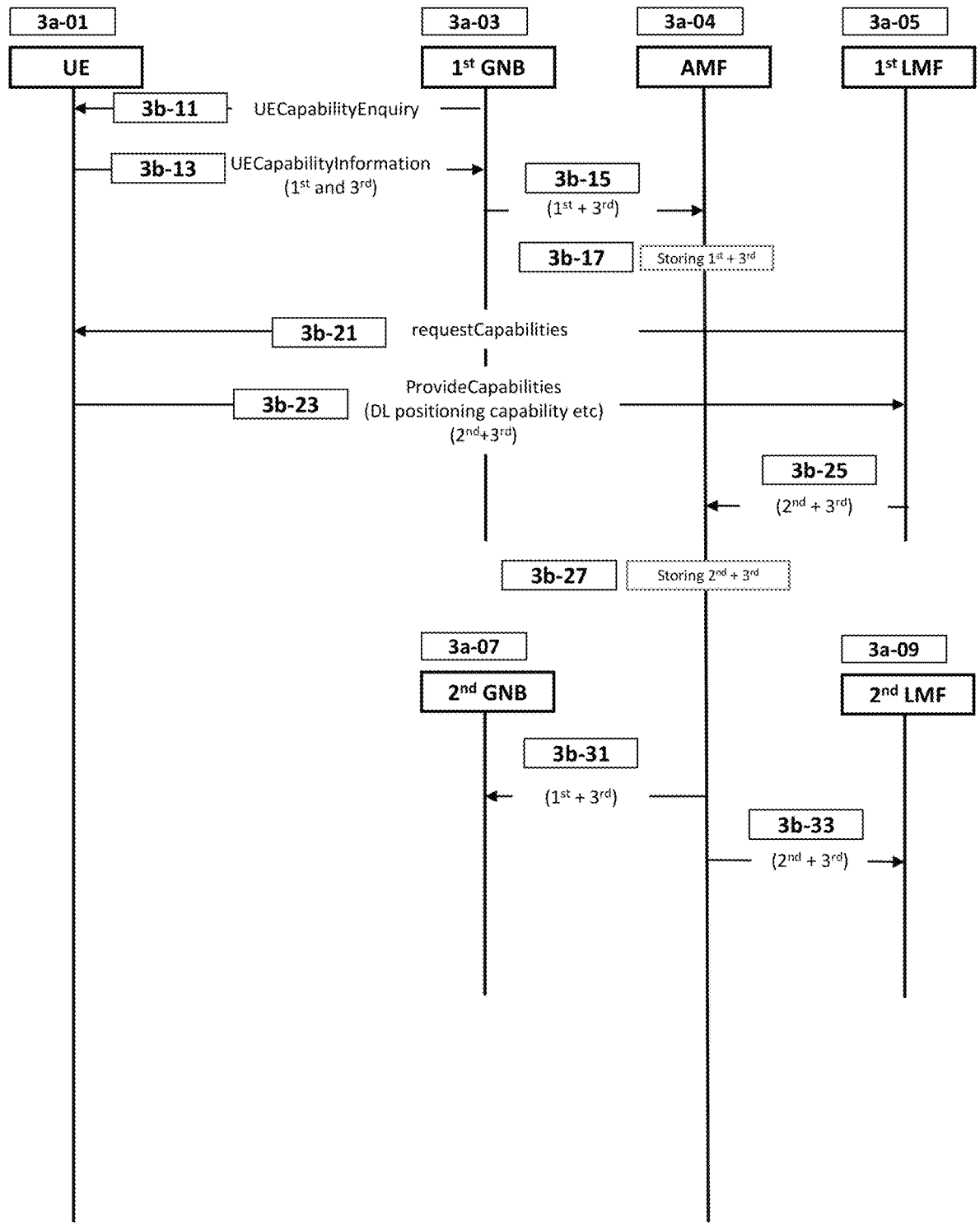
FIG. 3B is a flow diagram illustrating terminal capability reporting procedure.

FIG. 3A is a diagram illustrating the overall operation of a terminal, a base station, and an LMF.

In step 3A-11, the terminal selects a NR cell and camps on it. The terminal may select an NR cell in which downlink reference signal received power and downlink reference signal received quality exceed a predetermined threshold. The terminal does not consider neighboring cell information included in the System Information Block in cell selection.

In step 3A-13, the terminal receives system information from the base station in the selected NR cell. The terminal receives the MIB first, and receives SIB1 based on the information of the MIB. The terminal receives the remaining system information by referring to the scheduling information of SIB1.

In steps 3A-15, the terminal establishes an RRC connection with the base station. The terminal and the base station exchange RRCRequest messages, RRCSetup messages, and RRCSetupComplete messages through the random access process. When the terminal receives the RRCSetup message from the base station, the RRC connection is established. A terminal that has established an RRC connection may perform a positioning preparation procedure and a positioning execution procedure with a base station or LMF.

The positioning preparation procedure consists of a UE capability reporting phase 3A-17 and an assistance data delivery phase 3A-19. The positioning execution procedure 3A-21, 3A-23 consists of a terminal and a base station performing positioning measurement using an uplink signal and a downlink signal and reporting it to the LMF. The UE capability reporting phase is performed only in the RRC connected state, but the assistance data delivery phase and the positioning execution procedure may be performed not only in the RRC connected state but also in the RRC inactive state.

When the terminal receives assistance data and report configuration from the base station or the LMF, it measures for positioning based on the assistance data, and reports the measurement result to the LMF based on the report configuration. The terminal may receive the first type assistance data in AssistanceDataProvide and may receive Report Configuration in LocationInformationRequest. Upon receiving the LocationInformationRequest, the terminal performs positioning measurement based on the assistance data of the first type assistance data of AssistanceDataProvide and reports the measurement result to the LMF based on the Report Configuration of LocationInformationRequest. The terminal can receive the second type assistance data including Report Configuration and assistance data validity in one AssistanceDataProvide. When the validity of the assistance data is satisfied, the terminal performs the measurement for positioning based on the second type assistance data of the AssistanceDataProvide and reports the measurement result to the LMF based on the Report Configuration of the same AssistanceDataProvide.

3B is a diagram illustrating a terminal capability reporting procedure.

In step 3B-11, the first base station 3A-03 sends a UECapabilityEnquiry RRC message to the terminal 3A-01 to instruct it to report its capability.

In step 3B-13, the terminal reports the capability by sending a UECapabilityInformation RRC message to the first base station. UECapabilityInformation includes the first capability information and the third capability information. The base station may determine the positioning measurement configuration for the terminal by referring to the first capability information and the third capability information.

In step 3B-15, the first base station delivers the first capability information and the third capability information to the AMF 3A-04, and in step 3B-17, the AMF stores the first capability information and the third capability information for future use.

In step 3B-21, the first LMF 3A-05 instructs the terminal to report its capabilities by sending an LMF message named requestCapabilities. The message includes information indicating for which positioning method the terminal should report capability.

In step 3B-23, the terminal reports the capability by sending the LMF message provideCapabilities to the first LMF. provideCapabilities includes the second capability information and the third capability information. The first LMF refers to the second capability information and the third capability information to instruct positioning measurement for the terminal and to provide assistance data required by the terminal.

In step 3B-25, the first LMF transfers the second capability information and the third capability information to the AMF, and in step 3B-27, the AMF stores the second capability information and the third capability information for future use.

At some point of time in the future, the terminal establishes an RRC connection with the second base station 3A-07. When location services are initiated for the terminal, instead of the base station and the LMF obtaining relevant capability information directly from the terminal, the AMF provides the first performance information and the third performance information to the second base station in step 3B-31, and the AMF provides the second performance information and the third performance information stored by the AMF to the second LMF in step 3B-33.

The first capability information is the capability information reported by the terminal to the base station through the RRC control message, which is not required by the LMF but only by the base station, and includes the following information elements. First capability information is information required by the base station to establish positioning measurements and is information on capability closely related to the radio interface.

The first capability information1: it indicates whether the UE supports parallel transmission of SRS and PUCCH/PUSCH The first capability information2: it indicates whether the terminal supports SRS for positioning in the connected state (indicating support of SRS for positioning in RRC_CONNECTED). It is defined for each band of the band combination (or defined within the band combination) It is reported as part of the band combination specific capability information. The terminal reports band specific capability information for each band it supports. The terminal reports band combination specific capability information that is valid only for the band combination within the band combination for each band combination supported by the terminal. Whether the connection state positioning SRS is supported is indicated for each band in the band combination. For example, if the terminal supports band A, band B, and band combination [A, B], the terminal reports to the base station band A specific capability information applied to band A and band B specific capability information applied to band B and band A capability information in the band combination [A,B] and band B capability information in the band combination [A,B]. Terminal reports as band capability information of the band combination whether positioning SRS is supported in connected mode The first capability information3: it indicates the maximum number of configured pathloss reference RSs for PUSCH/PUCCH/SRS for pathloss reference RS update.

The first capability information4: it indicates measurement gap pattern(s) optionally supported by the UE for PRS measurement.

The first capability information5: it indicates support of small data transfer via SRB2.

The second capability information is capability information reported by the terminal to the LMF via LPP control message, which is not required by the base station but only by the LMF, and includes the following information elements. The second capability information is information required for the LMF to establish positioning measurement and positioning report. It is information on capability closely related to the positioning function.

The second capability information1: It indicate several positioning modes using a bit map. positioning mode information indicates a mode supported by the UE among UE-assisted and LMF-based mode, LMF-based mode, LMF-assisted and UE based mode, UE based mode and UE standalone mode.

The second capability information2: It indicates the target device's LPP message segmentation capabilities. If bit0 is 1, it indicates that the target device can receive the segmented LPP message. If bit1 is 1, it indicates that the target device can transmit a segmented LPP message.

The second capability information3: It indicates whether the target device can perform positioning measurement using PRS for a predetermined positioning method in an inactive state. The predetermined positioning method may be, for example, DL-AoD or DL-TDOA. That is, it indicates whether the terminal can measure PRS in the inactive state.

The second capability information4: It indicates whether the target device can report the positioning measurement result in the inactive state.

The third capability information is the capability information that the terminal reports to the LMF through LPP control messages and to the base station through RRC control messages, which is capability information required by both the LMF and the base station, and the following information elements are included.

The third capability information1: It indicates support of SRS for positioning in RRC_INACTIVE. It is defined per band and reported as part of band specific capability information.

The third capability information2: It is outer loop power control related information. It indicates whether the UE supports OLPC for SRS for positioning.

The third capability information3: It indicates whether the UE supports spatial relations for SRS for positioning.

The first capability information2 (indicating whether positioning SRS is supported in CONNECTED state) is reported to base station per band combination (or per feature set). The third capability information1 (indicating whether positioning SRS is supported in INACTIVE state) is reported per band to base station and to LMF. The definition of FeatureSet can be referred to 3GPP specification 38.331 and 38.306.

Capability information on positioning SRS in INACTIVE state is reported both to base station and to LMF. Capability information on PRS in INACTIVE state is reported to LMF only.

Figure 3C:
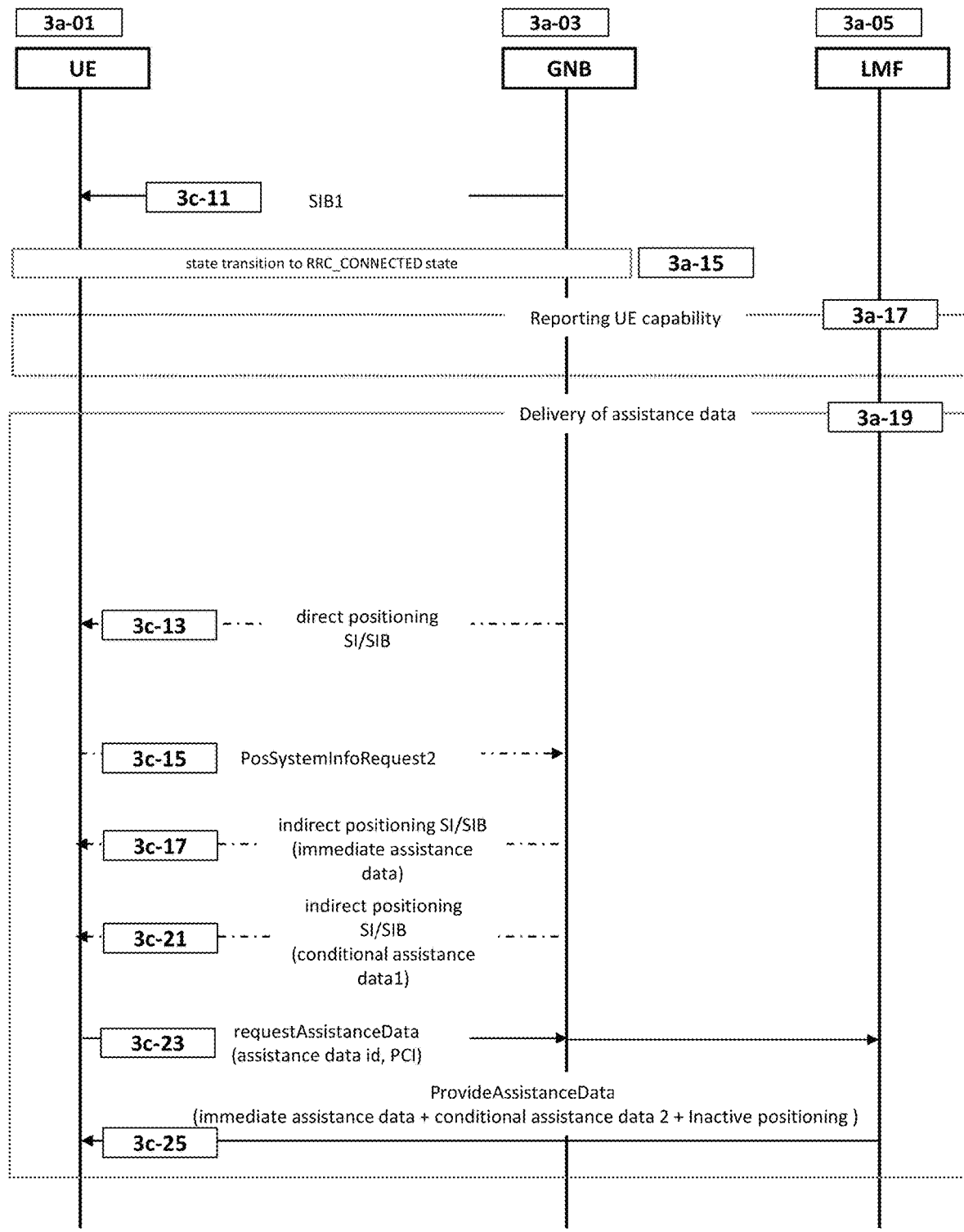
FIG. 3C is a flow diagram illustrating assistance data delivery procedure.

FIG. 3C is illustrating assistance data delivery phase.

The assistance data is classified into immediate assistance data (first type assistance data) and conditional assistance data (second type assistance data). The base station may provide assistance data using the positioning SIB. The LMF sets the contents of the assistance data included in the positioning SIB. The LMF can provide assistance data to the terminal using the LPP control message. The terminal may acquire assistance data through system information in the idle state as in steps 3A-13 or may acquire assistance data through system information after RRC connection state transition 3A-15. When the location service is started, the terminal may initiate a procedure for obtaining assistance data. The location service may be started regardless of the RRC state of the terminal.

In step 3C-11, the terminal receives SIB1 from the base station. The terminal stores SI scheduling information and positioning SI scheduling information.

The terminal transitions to the connected state through steps 3A-15 and 3A-17 and performs the terminal capability reporting step. If the location service is started, the terminal performs steps 3A-19 to obtain assistance data.

In steps 3C-13, the terminal receives the SI including the positioning SIB from the base station and determines whether the required assistance data is available in the corresponding cell. The required assistance data means assistance data for the location method supported by the terminal or assistance data for the location method to be used in the disclosed location service. The terminal determines, through the location SI scheduling information of SIB1, the required assistance data that is directly or indirectly provided in the cell and the required assistance data that is not provided in the cell. The assistance data that is currently being transmitted in the cell, i.e., the assistance data of the positioning SIB whose location SI broadcast status is set to broadcasting, is the assistance data that is directly provided in the cell. Assistance data that is not currently being transmitted in the cell but may be transmitted in the future, i.e., assistance data from positioning SIBs with positioning SI broadcast status set to non-broadcast, is indirectly provided by the cell. The terminal receives the positioning SI containing the directly provided positioning SIBs in steps 3C-13 as follows.

1: Determining the time interval in which the positioning SI/positioning SIB can be transmitted based on the SI window length in the SI scheduling information and positioning SIB mapping information and the order of the SI scheduling information in the positioning SI scheduling information obtained from SIB1.
2: Monitoring SI-RNTI in the time interval
3: Receiving a MAC PDU scheduled through SI-RNTI in the time interval
4: Acquiring positioning SI included in the MAC PDU In order to obtain the necessary positioning SIB provided indirectly, the terminal generates a positioning system information request2 requesting the base station to provide the positioning SIB.

In step 3C-15, the terminal sends positioning system information request2 to the base station. The terminal sets the requested positioning SIB list as follows.

1: Identifying the positioning SI mapped with the required positioning SIB
2: Identifying the positioning SI in which the positioning SI broadcast status is non-broadcast among the positioning SIs
3: Determining the positioning SIB mapped to the positioning SI
4: Including the positioning SIB type information in the requested positioning SIB list That is, the terminal includes, in the requested positioning SIB list, a positioning SIB mapped to a positioning SI in which the positioning SI broadcast status is set to non-broadcast among the required positioning SIBs.

In step 3C-17, the terminal receives the requested indirect positioning SIB/positioning SI from the base station. The indirect positioning SIB includes immediate assistance data1. The immediate assistance data1 may be, for example, GNSS-related assistance data included in positioning SIB1-x or positioning SIB2-x. Alternatively, immediate assistance data1 may be NR-DL-PRS-AssistanceData included in positioning SIB 6-1.

In step 3C-21, the terminal receives the requested indirect positioning SIB/positioning SI from the base station. The indirect positioning SIB includes conditional assistance data1. The conditional assistance data1 may be, for example, a conditional assistance data set included in positioning SIB 6-4.

The base station includes the immediate assistance data and the conditional assistance data in different positioning SIBs and maps the positioning SIB corresponding to the immediate assistance data and the positioning SIB corresponding to the conditional assistance data to the different positioning SIs. Through this, terminals requiring only immediate assistance data and terminals requiring only conditional assistance data can receive only required. In addition, assistance data can be provided more flexibly, for example, immediate assistance data is transmitted directly to positioning SIB/direct positioning SI and conditional assistance data is transmitted to indirect positioning SIB/indirect positioning SI.

In step 3C-23, the terminal transmits an LPP message called requestAssistanceData requesting assistance data to the base station. The LPP message is delivered to the LMF through the base station. requestAssistanceData is transmitted to the base station through SRB2/DCCH.

requestAssistanceData contains the fields below.
1: PCI of PCell. The LMF identifies the cell in which the terminal is located by referring to the PCI of the PCell and determines the assistance data valid for the cell and the adjacent area.
2: Type of required assistance information. It indicates the type of assistance data requested by the terminal. This field indicates the relevant positioning method. For example, if this field indicates GNSS, the LMF determines that the terminal requests to provide GNSS-related assistance data.
3: Identifier of conditional assistance data1 that needs to be activated. It is an identifier of conditional assistance data1 for which a terminal wants to activate among conditional assistance data1 obtained through positioning SIB or the like. The terminal indicates the assistance data id 2D-07 of the desired conditional assistance data 2D-05 among the plurality of conditional assistance data 2D-05 included in the conditional assistance data set 2D-01.
4: Information indicating that the required (or requested) assistance data is conditional assistance data. The terminal includes this field if the conditional assistance data 1 received from the base station does not include the conditional assistance data for the positioning method it wants.

In step 3C-25, the LMF transmits an LPP message called ProvideAssistanceData that provides assistance data to the terminal. ProvideAssistanceData contains the fields below.
1: immediate assistance data. Among the immediate assistance data requested by the terminal, this is the immediate assistance data that the LMF can provide.
2: Activated conditional assistance data id. The activated conditional assistance data is indicated among the conditional assistance data1 for which the terminal has requested activation. It is indicated by the assistance data id.
3: conditional assistance data2. Among the conditional assistance data requested by the terminal, this is the conditional assistance data that the LMF can provide. When a predetermined condition is met, the terminal performs positioning measurement by applying conditional assistance data2 and reports the positioning measurement result to the LMF.
4: inactive positioning. Information indicating whether the terminal should perform positioning-related operations in the inactive state. It may be at least one of the following three pieces of information.
4-1: positioning measurement continuation indicator: 1-bit information indicating whether to continue the currently performed positioning measurement operation after transitioning to the inactive state.
4-2: conditional assistance data based positioning measurement: 1-bit information instructing to perform positioning measurement by applying available conditional assistance data when transitioning to an inactive state. The available conditional assistance data may be a plurality of conditional assistance data included in conditional assistance data1 and a plurality of conditional assistance data included in conditional assistance data2.
4-3: inactive positioning measurement method list: A list of positioning measurement methods to be performed by the terminal when transitioning to inactive state. It may be composed of a bitmap in which each bit is mapped with a predetermined positioning measurement method.

The terminal may perform positioning measurement by measuring PRSs indicated in immediate assistance data and PRSs indicated in activated conditional assistance data1.

The terminal reports the PCI to the LMF in requestAssistanceData. The LMF may provide conditional assistance data validity information composed of multiple NR CGIs to the terminal in ProvideAssistanceData. Alternatively, the LMF may provide conditional assistance data validity information composed of a plurality of CellIdentity to the terminal in ProvideAssistanceData. Alternatively, the LMF may provide conditional assistance data validity information composed of a plurality of cell identities and a plurality of base station identifier (gNB identifier) length information to the terminal in ProvideAssistanceData.

LMF considers PCI and determines which cell's assistance data to provide to the terminal. The terminal determines in which cell the assistance data is valid by considering the cell identifier provided by the LMF.

The NR CGI consists of MCC (Mobile Country Code) and MNC (Mobile Network Code), which are information indicating the PLMN, and Cell Identity, which is information indicating the cell. Cell Identity has a size of 36 bits, and the leftmost n bits are the base station indicator (gNB identifier). The n has a variable size between 22 and 32 and may be known to the terminal as separate information called base station identifier length information. PCI is an integer between 0 and 1007. PCI is an indicator that specifies a cell within a relatively narrow area, NR CGI is an indicator that specifies a cell globally, and Cell Identity is an indicator that specifies a cell within one PLMN.

Figure 3D:
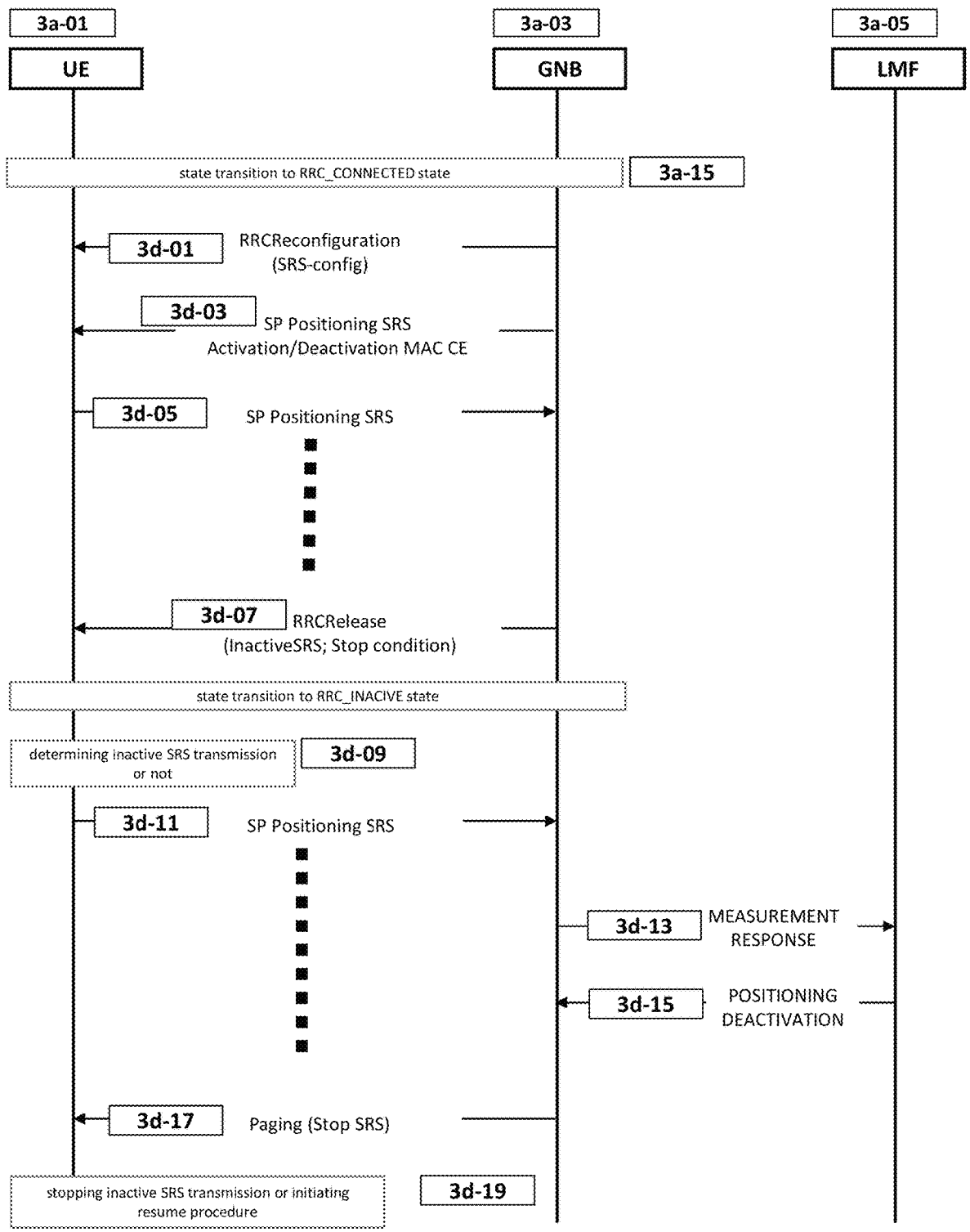
FIG. 3D is a flow diagram illustrating uplink positioning procedure of terminal in RRC_INACTIVE.

FIG. 3D is a diagram illustrating an uplink positioning process of an inactive terminal.

In the uplink positioning process, the terminal in the RRC connected state receives the SRS configuration from the base station and transmits the SRS, the base station measures the SRS and reports the measurement result to the LMF, and the LMF calculates the terminal's position based on the measurement result. Although the SRS measurement can be performed by several base stations, only one base station is illustrated in FIG. 3D for convenience.

In step 3D-01, the terminal receives an RRCReconfiguration message including SRS configuration from the base station. The SRS configuration may be provided for each UL BWP, and the SRS configuration consists of one or more SRS-PosResourceSet (hereinafter, SRS positioning resource set). One SRS positioning resource set consists of one or more SRS-PosResource (hereinafter, SRS positioning resource).

The SRS positioning resource is defined by srs-PosResourceId (SRS positioning resource identifier), startPosition, nrofSymbols, freqDomainShift, freqHopping, periodicityAndOffset-sp, spatialRelationInfoPos, and the like.

startPosition and nrofSymbols indicate the start position of a symbol in which SRS is transmitted and the number of symbols in which SRS is transmitted in the positioning SRS slot.

freqDomainShift and freqHopping define the frequency resource through which the SRS is transmitted in relation to the frequency domain of the corresponding BWP.

periodicityAndOffset-sp indicates the periodicity and the slot at which the positioning SRS slot starts. The positioning SRS slot means a slot in which a positioning SRS resource is configured or a slot in which a positioning SRS is transmitted.

spatialRelationInfoPos defines a spatial domain transmission filter to be applied to positioning SRS transmission and may be set to a downlink reference signal index of a serving cell, an SSB index of a neighboring cell, and the like.

SRS positioning resource set consists of SRS positioning resource set identifier, SRS positioning resource identifier list, ResourceType, alpha, p0, pathlossReferenceRS-Pos.

SRS positioning resource identifier list is the list of SRS positioning resource identifiers composing the SRS positioning resource set.

ResourceType indicates one of "periodic" and "semi-persistent" and "aperiodic". In the present disclosure, a semi-persistent SRS positioning resource set will be described as an example. For SRS positioning resource set of which ResourceType is indicated as semi-persistent, SRS transmission of SRS positioning resource set starts only after a specific control message instructs transmission.

alpha, p0 and pathlossReferenceRS-Pos are parameters for transmission power control of positioning SRS. alpha and p0 are power offsets that are added when determining positioning SRS transmission power, and pathlossReferenceRS-Pos provides path loss when determining positioning SRS transmission power. is the reference signal.

In step 3D-03, the terminal receives a Positioning SRS Activation/Deactivation MAC CE instructing to start transmission of a specific SRS positioning resource set from the base station.

The Positioning SRS Activation/Deactivation MAC CE consists of an A/D field, a Cell ID field, a BWP ID field, a SUL field, and a Positioning SRS Resource Set ID.

The A/D field indicates whether to activate or deactivate the indicated SRS positioning resource set.

The Cell ID field indicates the identifier of the serving cell to which the SRS positioning resource set to be activated/deactivated belongs.

The BWP ID field indicates the identifier of the BWP to which the SRS positioning resource set to be activated/deactivated belongs.

The SUL field indicates whether the MAC CE is applied to a NUL carrier configuration or to a SUL carrier configuration. Or it indicates whether the activated or deactivated SRS positioning resource set is an SRS positioning resource set of SUL or an SRS positioning resource set of NUL.

The Positioning SRS Resource Set ID field is an identifier of the SRS positioning resource set to be activated or deactivated.

NUL is normal uplink and SUL is supplementary uplink. One serving cell may have only NUL or may have NUL and SUL. The SUL is configured in the low frequency band comparing to the NUL to increase the uplink coverage of the cell.

In step 3D-05, the terminal transmits a positioning SRS in the activated SRS positioning resource set. The terminal transmits the positioning SRS from SRS positioning resources belonging to the SRS positioning resource set by applying the transmission power control parameter of the SRS resource set. The SRS positioning resources are periodically generated according to periodicityAndOffset-sp.

In step 3D-07, the terminal receives the RRCRelease message from the base station.

The base station may change the state of the terminal to RRC_INACTIVE or RRC_IDLE in consideration of the terminal's traffic condition, cell load condition, and RRM condition of the terminal. If the uplink positioning has not yet been completed, the base station instructs the terminal to transition to the RRC_INACTIVE state while continuing to transmit the positioning SRS. The base station transmits an RRCRelease message including inactive SRS IE, stop condition IE, and SuspendConfig IE to the terminal.

The terminal stores the SRS configuration in the Inactive Access Stratum Context.

The terminal receiving the message performs cell selection. At this time, the terminal preferentially selects the first cell if it is possible to select the first cell. If the reference signal received quality of the first cell is higher than a predetermined threshold, the terminal preferentially selects the first cell and camps on it. The first cell is one of a serving cell in which the terminal receives the RRCRelease message, a PCell at the time point when the terminal receives the RRCRelease message, or a serving cell in which the SRS positioning resource set is activated. Alternatively, the first cell may be a cell belonging to the first cell list. The first cell list includes a plurality of cell information, and each cell information includes PCI and an Absolute Radio Frequency Channel Number (ARFCN). The first cell list may be included in the RRCRelease message and transmitted to the terminal. ARFCN is defined in specification 38.101, and each AFRCN corresponds to a specific frequency.

In step 3D-09, the terminal determines whether to continue to perform positioning SRS transmission, if so, which SRS positioning resource set to transmit. The terminal determines whether to transmit the positioning SRS in consideration of the inactive SRS IE and whether the newly reselected cell is the first cell. The inactive SRS IE includes one of an inactive SRS transmission continuation indicator, the first SRS resource set IE and the second SRS resource set IE. The inactive SRS IE may also include an SRS transmission stop condition IE. The inactive SRS IE may also include an SRS transmission condition IE.

The inactive SRS transmission continuation indicates that among the currently active SRS positioning resource sets, the SRS positioning resource set of NUL continues to transmit and the SRS positioning resource set of SUL stops transmission. The terminal performs the above operation if the indicator is included.

The first SRS resource set IE consists of an identifier of an SRS positioning resource set, a cell identifier, a BWP identifier, and the like. After the terminal transitions to the inactive state, it transmits the positioning SRS by activating the SRS positioning resource set specified by the cell identifier, the BWP identifier, and the SRS positioning resource set identifier. The SRS positioning resource set to be activated is limited to the SRS positioning resource set in the BWP of the NUL. In other words, when the NUL BWP and the SUL BWP having the same BWP identifier exist, the SRS positioning resource set identifier is an identifier indicating the SRS positioning resource set in the NUL BWP. The identifier of the SRS positioning resource set indicates a specific SRS positioning resource set of a specific BWP of the NUL of a specific serving cell, and the SRS positioning resource set corresponding to the SRS positioning resource set identifier is defined in the SRS configuration provided for the specific BWP. Alternatively, the first SRS resource set IE may include an identifier of an SRS positioning resource set, a cell identifier, a BWP identifier, and a SUL indicator. If the SUL indicator is not included in the first SRS resource set IE, the inactive state terminal transmits a positioning SRS in the NUL, and when the SUL indicator is included in the first SRS resource set IE, the inactive state terminal transmits a positioning SRS in the SUL.

The second SRS resource set IE consists of an SRS positioning resource set IE, a cell identifier, a BWP identifier, and the like. After transitioning to the inactive state, the terminal transmits the positioning SRS in the SRS positioning resource specified by the SRS positioning resource set IE in the frequency domain indicated by the cell identifier and the BWP identifier. At this time, if there are two BWPs corresponding to the BWP identifier, a BWP of NUL is selected. Alternatively, the second SRS resource set IE may include an SRS positioning resource set IE, a cell identifier, a BWP identifier, a SUL indicator, and the like. If the SUL indicator is not included in the second SRS resource set IE, the inactive state terminal transmits a positioning SRS in the NUL, and when the SUL indicator is included in the second SRS resource set IE, the inactive state terminal transmits a positioning SRS in the SUL.

The SRS transmission stop condition IE defines a condition for stopping the transmission of the positioning SRS, which the terminal was transmitting in the inactive state. The SRS transmission stop condition may be the number of positioning SRS transmissions, a time point to stop positioning SRS transmission, and the like.

The SRS transmission condition IE defines the conditions that must be satisfied in order for the terminal to transmit the positioning SRS in the inactive state. The SRS transmission condition may be defined as the first time point and the second time point. The terminal starts transmitting positioning SRS at the first time point in the inactive state and stops transmitting positioning SRS at the second time point. The first time point and the second time point may be indicated by the SFN and subframe number of the first cell. The first time point and the second time point can be expressed in absolute times such as UTC.

If the newly selected cell is the first cell and the inactive SRS IE exists, the terminal transmits the positioning SRS as described above even in the inactive state.

If the newly selected cell is not the first cell, the terminal removes the SRS configuration from the inactive AS context and does not transmit the positioning SRS in the inactive state.

In step 3D-11, the terminal periodically transmits the positioning SRS in the inactive state. The terminal continues to transmit the previously activated SRS positioning resource set. Or the terminal deactivates the previously activated SRS positioning resource set, activates the SRS positioning resource set indicated in the first SRS resource set IE and transmits the SRS positioning resource set. Or the terminal deactivates the previously activated SRS positioning resource set, activates the SRS positioning resource set indicated in the second SRS resource set IE and transmits the SRS positioning resource set.

The base station collects location-related measurement information by receiving the positioning SRS transmitted by the terminal in the inactive state.

In step 3D-13, the base station transmits a MEASUREMENT RESPONSE message including the SRS measurement result to the LMF. The LMF calculates the position of the terminal using the measurement result. When positioning of the terminal is completed, the LMF notifies the base station that positioning is complete.

In step 3D-15, the base station receives the message POSITIONING DEACTIVATION from the LMF and recognizes that the uplink positioning has been completed.

In step 3D-17, the base station transmits a downlink control message to stop transmitting the positioning SRS of the terminal. The downlink control message may be, for example, a paging message. The base station may include the terminal's I-RNTI (inactive wireless network temporary identifier) and positioning SRS transmission stop information in the paging message. The I-RNTI is assigned in the RRCRelease message. The RRCRelease message allocates two I-RNTIs: a full I-RNTI and a short I-RNTI. The terminal determines whether an I-RNTI matching its full I-RNTI is included in the paging.

Upon receiving the paging message including its I-RNTI, the terminal determines whether information related to SRS transmission stop, for example, positioning SRS transmission stop information, is included in the paging message. The terminal performs one of the following actions according to its judgment.

1: If the paging message including its I-RNTI does not contain information related to SRS stop and inactive SRS transmission is being performed, the terminal stops SRS transmission and initiates the RRC connection resumption procedure.
2: If the paging message including its I-RNTI does not include information related to SRS stop and inactive SRS transmission is not being performed, the terminal initiates the RRC connection resumption procedure.
3: If information related to SRS stop is included in the paging message including its I-RNTI and inactive SRS transmission is being performed, the terminal stops SRS transmission and does not initiate the RRC connection resumption procedure.
4: If the paging message including its I-RNTI includes information related to SRS stop and inactive SRS transmission is not being performed, the terminal ignores the paging message and does not initiate the RRC connection resumption procedure.

The terminal performs random access to perform a resumption procedure and transmits a predetermined uplink RRC control message.

In step 3D-19, the terminal stops inactive SRS transmission or initiates a resumption procedure with reference to the information included in the paging message.

A terminal in inactive state stops transmitting positioning SRS in the following cases.

1: The cell selected after receiving the RRCRelease message is not the first cell.
2: Reselect another cell from the first cell.
3: SRS transmission stop condition is satisfied.
4: The resumption procedure is started.
5: Receives a paging message indicating to stop inactive SRS transmission.

One paging message includes a plurality of pagingRecords, and each pagingRecord among the plurality of pagingRecords includes one terminalidentifier field and one second information field. Among the plurality of pagingRecords, in each pagingRecord, the terminalidentifier field is mandatory present and the second information field is optionally present. The terminalidentifier field is set to full I-RNTI and the second information field is enumerated with a single value indicating an SRS stop.

Optionally present IE being enumerated with a single value means that the single value is applied if the IE is present and the single value is not applied if the IE is not present.

Figure 3E:
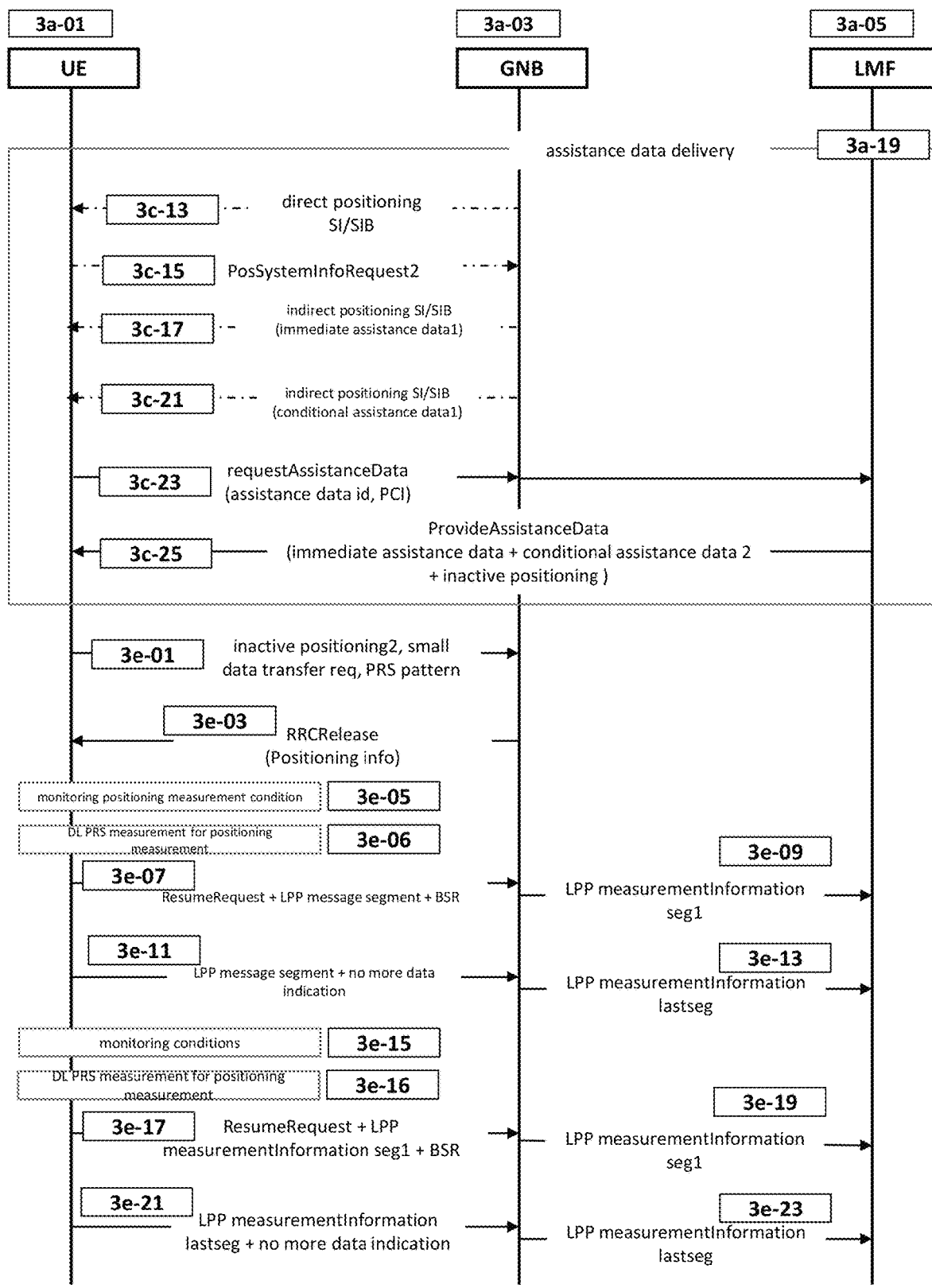
FIG. 3E is a flow diagram illustrating downlink positioning procedure of terminal in RRC_INACTIVE.

FIG. 3E is a diagram illustrating a downlink positioning process of an inactive terminal.

A terminal that has obtained immediate assistance data, conditional assistance data1, and conditional assistance data2 through steps 3C-13 to 3C-25 performs an operation related to downlink positioning by using the assistance data.

An operation related to downlink positioning is, for example, measuring the reception time difference of PRSs transmitted from a plurality of TRPs and reporting the result to the LMF, or measuring the received power of PRSs transmitted from a plurality of TRPs and reporting to the LMF, etc.

In step 3E-01, the terminal generates an RRC control message called UEAssistanceInformation to report to the base station that downlink positioning should be performed even in the RRC_INACTIVE state and transmits it to the base station. The control message may include an inactive positioning2 IE indicating the type of positioning method that the terminal can perform in an inactive state. the control message can include a information requesting to configure small data transfer via SRB2. The control message may include time pattern information of PRS for positioning. The terminal performs steps 3E-03 if the inactive positioning IE is included in the ProvideAssistanceData received in steps 3C-25.

In step 3E-03, the base station sends an RRCRelease message to the terminal.

The base station may change the state of the terminal to RRC_INACTIVE or RRC_IDLE in consideration of the terminal's traffic condition, cell load condition, and RRM condition of the terminal. If the base station determines that the terminal needs to measure positioning in the inactive state, the base station may provide information related to downlink positioning measurement while instructing the terminal to transition to the RRC_INACTIVE state.

Information related to downlink positioning measurement may include, for example, offset information for moving the paging monitoring period of the terminal so that the paging monitoring time interval of the terminal does not overlap with the PRS measurement period.

The base station can configure small data transfer through SRB2 to the terminal. The small data transfer configuration may consist of a list of data bearers for which small data transfer is configured, and 1-bit information indicating whether small data transfer can be configured to SRB2. When small data transfer is applied to SRB2, the terminal can transmit the data of SRB2 to the base station through the small data transfer procedure. The small data transfer procedure is a procedure in which the RRC_INACTIVE terminal transmits small data through the RRC connection resumption procedure without transitioning to RRC_CONNECTED.

Upon receiving the RRCRelease message including information related to downlink positioning measurement, the terminal performs cell selection. At this time, if the reference signal received power of the second cell is greater than or equal to a predetermined threshold, the terminal preferentially selects the second cell to camp on. The second cell may be a serving cell receiving the RRCRelease message or a PCell at a time point receiving the RRCRelease message.

In step 3E-05, the terminal selecting the new cell monitors whether the assistance data validity is met. If the newly selected cell is the second cell, the terminal considers both conditional assistance data1 and conditional assistance data2. The terminal considers only conditional assistance data2 if the newly selected cell is not the second cell.

The terminal monitors if at least one assistance data validity is fulfilled among the assistance data validity of which data status is broadcast included in either conditional assistance data1 or conditional assistance data2.

In step 3E-06, if it is determined that the assistance data of the conditional assistance data for which the assistance data validity is satisfied is determined to be valid, the terminal starts measuring the downlink PRSs specified in the assistance data. The terminal measures the arrival time difference of PRSs transmitted by a plurality of TRPs. When the PRS measurement is completed, the terminal generates an LPP ProvideLocatinoInformation message including the measurement result. The terminal initiates a small data transfer procedure to transmit the LPP message. If necessary, the ProvideLocatinoInformation message can be segmented into a plurality of segments and transmitted. The ProvideLocatinoInformation message includes information on arrival time difference of PRSs transmitted by a plurality of TRPs, one assistance data identifier and a plurality of downlink positioning reference signal identifiers (DL-PRS id). The downlink positioning reference signal identifier is an identifier of the measured PRSs, and the assistance data identifier is an identifier of assistance data providing the configuration of the measured PRSs. If the PRS measurement is made based on the first type assistance data, the ProvideLocatinoInformation message includes a plurality of measurement results and a plurality of downlink positioning reference signal identifiers. If the RRS measurement is made based on the second type assistance data, the ProvideLocatinoInformation message includes a plurality of measurement results and a plurality of downlink positioning reference signal identifiers and one assistance data id.

In step 3E-07, the terminal transmits a ResumeRequest, an LPP segment message, and a MAC PDU including a Buffer Status Report (BSR) to the base station. The LPP segment message includes the first segment of the LPP ProvideLocatinoInformation message. The BSR includes information on the size of the remaining segments of the LPP ProvideLocatinoInformation message. The ResumeRequest belongs to SRB0 and the LPP segment message belongs to SRB2. The ResumeRequest of SRB0 is not ciphered, the LPP segment message of SRB2 is ciphered, and the BSR is not ciphered. The ciphering is performed with a new security key calculated through the value of NCC received by the terminal in the RRCRelease message and the security key stored by the terminal. In principle, all RRC messages are ciphered, but the RRC message of SRB0 is not ciphered because it is a message that the base station must process without prior information. Since BSR is information processed by the MAC layer of the base station, it is not ciphered. As a result, the MAC PDU transmitted to report the positioning measurement result in the inactive state includes three MAC subPDUs, the first MAC subPDU and the third MAC subPDU include an unciphered payload, and the second MAC subPDU includes a ciphered payload.

The terminal reports the amount of data available for transmission through the BSR. The RRC_CONNECTED terminal determines the BSR format in consideration of the number of logical channel groups in which data available for transmission exists. That is, the RRC_CONNECTED terminal uses the first BSR if the number of logical channel groups in which data available for transmission is one and uses the second BSR if it is more than one. The RRC_INACTIVE terminal determines the BSR format without considering the number of logical channel groups in which data available for transmission exists. That is, the RRC_INACTIVE terminal uses the first BSR even if the number of logical channel groups in which data available for transmission exists is more than one. The RRC_INACTIVE terminal sets the identifier of a logical channel group with the highest priority among logical channel groups in which data available for transmission exists in the logical channel group identifier field 2H-01, and sets in the first buffer size field 2H-03 the first buffer size index corresponding to the amount of data available for transmission across all the logical channels.

The RRC_INACTIVE terminal uses the logical channel group identifier predefined in the specification instead of the logical channel group identifier configured in the RRC_CONNECTED state. In the RRC_INACTIVE state, the terminal uses the preconfigured configuration instead of the terminal specific configuration because the base station does not know the terminal's buffer status reporting configuration.

The RRC_CONNECTED terminal determines the buffer size index to be set in buffer size field of the BSR by considering only the data of the PDCP layer and the data of the RLC layer. If RRC_INACTIVE terminal operates in the same manner, remaining LPP segments stored in LPP layer is not considered. To overcome this problem, the RRC_INACTIVE terminal determines the buffer size index to be set in buffer size field by considering the amount of data of PDCP layer and data of RLC layer and data of LPP layer (or upper layers of PDCP layer or upper layers of RRC layer). That is, a buffer size index corresponding to the sum of all the data amounts is selected.

- In step 3E-09, the base station transmits a locationInformation segment to the LMF.
- In step 3E-11, the terminal transmits the MAC PDU including the LPP segment message and information indicating no more data for transmission. The LPP segment message includes the last segment of the LPP ProvideLocatinoInformation message. Information indicating no more data for transmission may be the first BSR in which buffer size index 0 is set.
- In step 3E-13, the base station transmits a locationInformation segment to the LMF. After receiving the last segment, the LMF assembles the segments to make a location information message and determines the location of the terminal by referring to the positioning measurement result of the location information message.
- In steps 3E-15, the terminal monitors whether the assistance data validity is met.
- In step 3E-16, when it is determined that the assistance data of the conditional assistance data for which the assistance data validity is satisfied is determined to be valid, the terminal starts measuring the downlink PRSs specified in the assistance data.
- In step 3E-17, the terminal transmits the MAC PDU including ResumeRequest, LPP segment message and BSR (Buffer Status Report) to the base station.
- In step 3E-19, the base station transmits a locationInformation segment to the LMF.
- In step 3E-21, the terminal transmits the MAC PDU including the LPP segment message and information indicating no more data for transmission.
- In step 3E-23, the base station transmits an LPP segment message to the LMF. After receiving the last segment, the LMF assembles the segments to generate a location information message and determines the location of the terminal by referring to the positioning measurement result of the locationInformation message.
- If the terminal transitions to RRC_IDLE or RRC_CONNECTED or the assistance data validity is not met, the terminal stops measuring the downlink PRS for location measurement and reporting the measurement result.

Figure 4:
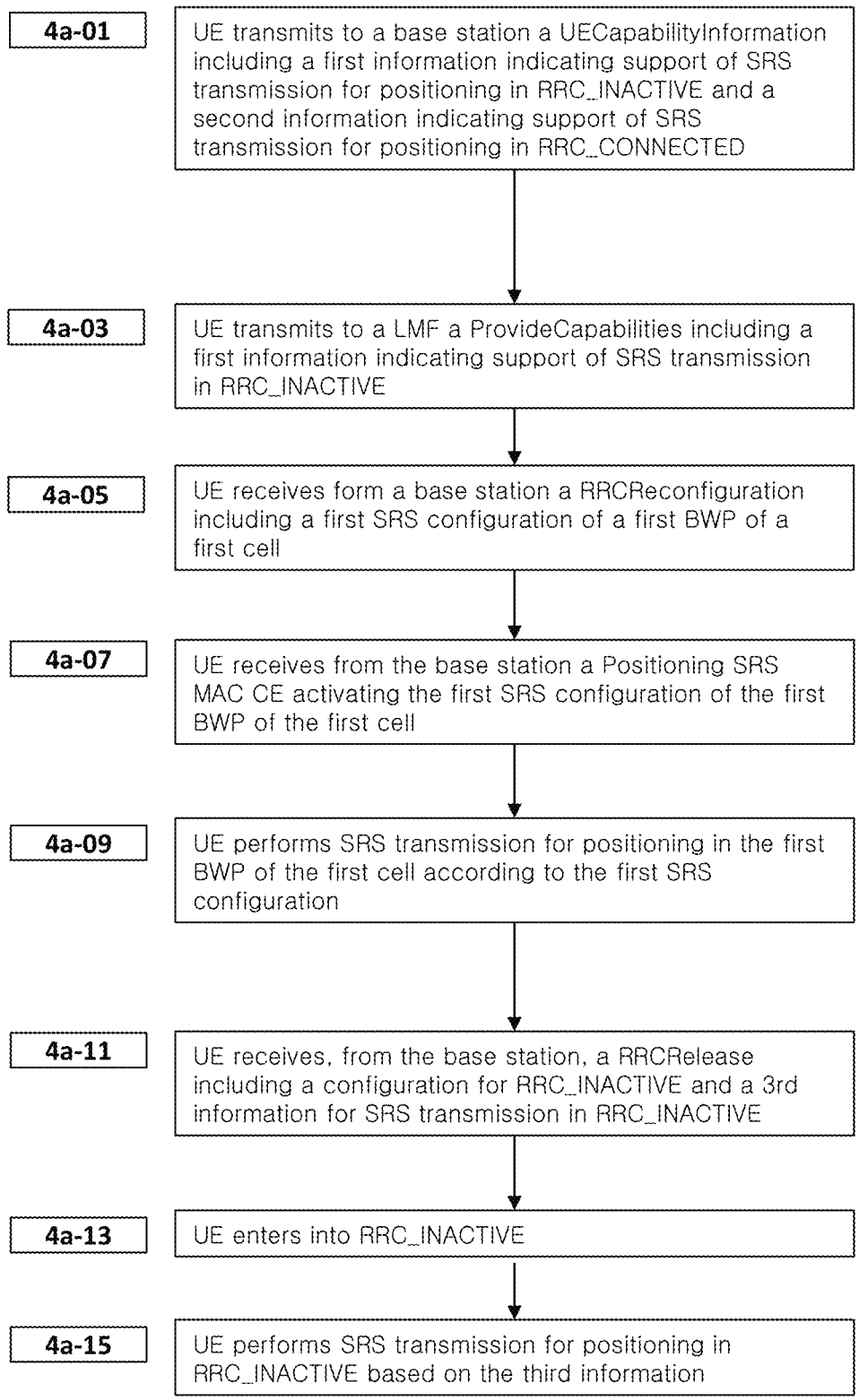
FIG. 4 is a diagram illustrating operation of terminal according to the first embodiment of the present invention.

FIG. 4 is a flow diagram illustrating an operation of a terminal.

- In 4a-01, UE transmits to a base station a UECapabilityInformation including a first information indicating support of SRS transmission for positioning in RRC_INACTIVE and a second information indicating support of SRS transmission for positioning in RRC_CONNECTED.
- In 4a-03, UE transmits to a LMF a ProvideCapabilities including a first information indicating support of SRS transmission in RRC_INACTIVE.
- In 4a-05, UE receives form a base station a RRCReconfiguration including a first SRS configuration of a first BWP of a first cell.
- In 4a-07, UE receives from the base station a Positioning SRS MAC CE activating the first SRS configuration of the first BWP of the first cell.
- In 4a-09, UE performs SRS transmission for positioning in the first BWP of the first cell according to the first SRS configuration.
- In 4a-11, UE receives, from the base station, a RRCRelease including a configuration for RRC_INACTIVE and a 3rd information for SRS transmission in RRC_INACTIVE.
- In 4a-13, UE enters into RRC_INACTIVE.
- In 4a-15, UE performs SRS transmission for positioning in RRC_INACTIVE based on the third information.

The third information is either the first SRS information or the second SRS information.

The first SRS information includes an SRS resource set identifier, a BWP identifier and a serving cell identifier.

The second SRS information includes an SRS resource set information.

The first SRS information instructs UE to perform SRS transmission, in RRC_INACTIVE, on the PRS resource set indicated by SRS resource set identifier and the second SRS information instructs UE to stop, in RRC_INACTIVE, SRS transmission according to SRS resource set information.

UE stores the first SRS information in INACTIVE context if UE receives a RRCRelease including a configuration for RRC_INACTIVE and the 3rd information for SRS transmission in RRC_INACTIVE.

Figure 5A:
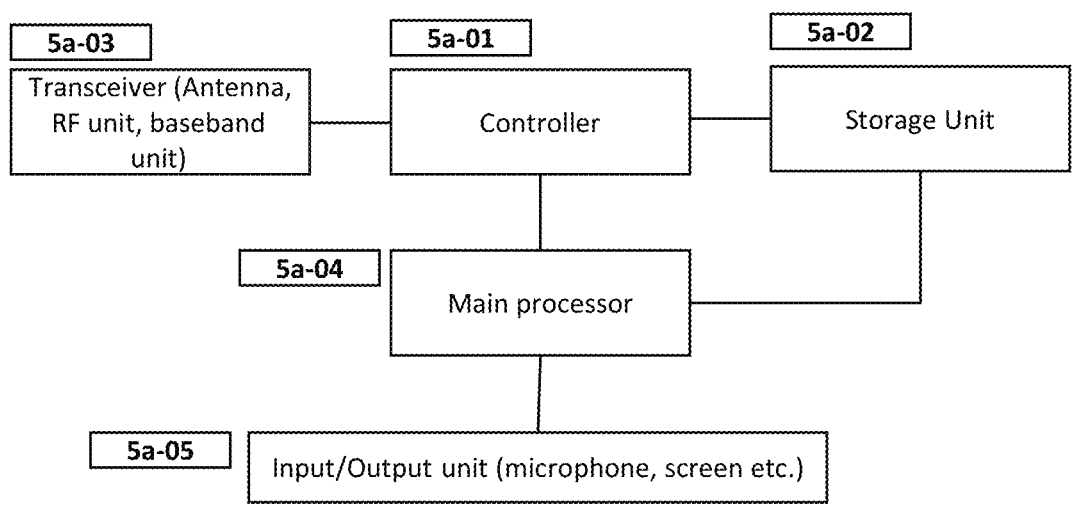
FIG. 5A is a block diagram illustrating the internal structure of a UE to which the disclosure is applied.

FIG. 5A is a block diagram illustrating the internal structure of a UE to which the disclosure is applied.

Referring to the diagram, the UE includes a controller 5A-01, a storage unit 5A-02, a transceiver 5A-03, a main processor 5A-04 and I/O unit 5A-05.

The controller 5A-01 controls the overall operations of the UE in terms of mobile communication. For example, the controller 5A-01 receives/transmits signals through the transceiver 5A-03. In addition, the controller 5A-01 records and reads data in the storage unit 5A-02. To this end, the controller 5A-01 includes at least one processor. For example, the controller 5A-01 may include a communication processor CP that performs control for communication and an application processor AP that controls the upper layer, such as an application program. The controller controls storage unit and transceiver such that UE operations illustrated in FIG. 2A and FIG. 2B and FIG. 3A are performed.

The storage unit 5A-02 stores data for operation of the UE, such as a basic program, an application program, and configuration information. The storage unit 5A-02 provides stored data at a request of the controller 5A-01.

The transceiver 5A-03 consists of a RF processor, a baseband processor and plurality of antennas. The RF processor performs functions for transmitting/receiving signals through a wireless channel, such as signal band conversion, amplification, and the like. Specifically, the RF processor up—converts a baseband signal provided from the baseband processor into an RF band signal, transmits the same through an antenna, and down—converts an RF band signal received through the antenna into a baseband signal. The RF processor may include a transmission filter, a reception filter, an amplifier, a mi10r, an oscillator, a digital-to-analog converter (DAC), an analog-to-digital converter (ADC), and the like. The RF processor may perform MIMO and may receive multiple layers when performing the MIMO operation. The baseband processor performs a function of conversion between a baseband signal and a bit string according to the physical layer specification of the system. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The main processor 5A-04 controls the overall operations other than mobile operation. The main processor 5A-04 process user input received from I/O unit 5A-05, stores data in the storage unit 5A-02, controls the controller 5A-01 for required mobile communication operations and forward user data to I/O unit 5A-05.

I/O unit 5A-05 consists of equipment for inputting user data and for outputting user data such as a microphone and a screen. I/O unit 5A-05 performs inputting and outputting user data based on the main processor's instruction.

Figure 5B:
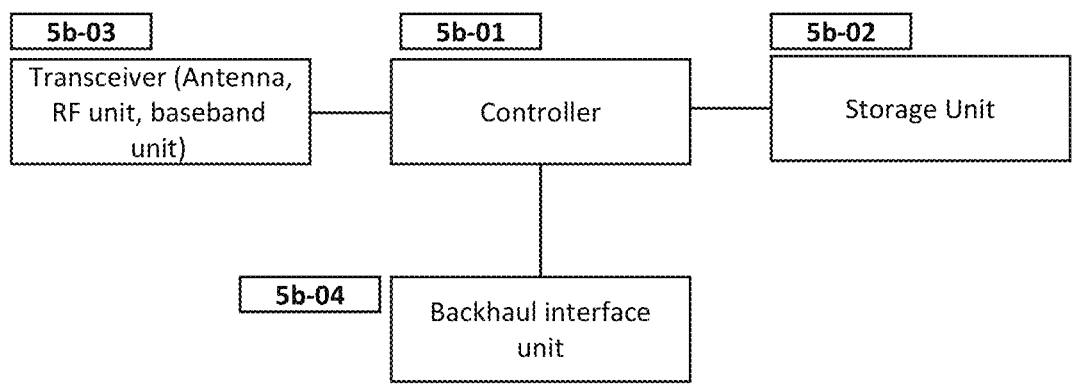
FIG. 5B is a block diagram illustrating the configuration of a base station according to the disclosure.

FIG. 5B is a block diagram illustrating the configuration of a base station according to the disclosure.

As illustrated in the diagram, the base station includes a controller 5B-01, a storage unit 5B-02, a transceiver 5B-03 and a backhaul interface unit 5B-04.

The controller 5B-01 controls the overall operations of the main base station. For example, the controller 5B-01 receives/transmits signals through the transceiver 5B-03, or through the backhaul interface unit 5B-04. In addition, the controller 5B-01 records and reads data in the storage unit 5B-02. To this end, the controller 5B-01 may include at least one processor. The controller controls transceiver, storage unit and backhaul interface such that base station operation illustrated in FIG. 2A and FIG. 2B are performed.

The storage unit 5B-02 stores data for operation of the main base station, such as a basic program, an application program, and configuration information. Particularly, the storage unit 5B-02 may store information regarding a bearer allocated to an accessed UE, a measurement result reported from the accessed UE, and the like. In addition, the storage unit 5B-02 may store information serving as a criterion to deter mine whether to provide the UE with multi-connection or to discontinue the same. In addition, the storage unit 5B-02 provides stored data at a request of the controller 5B-01.

The transceiver 5B-03 consists of a RF processor, a baseband processor and plurality of antennas. The RF processor performs functions for transmitting/receiving signals through a wireless channel, such as signal band conversion, amplification, and the like. Specifically, the RF processor up—converts a baseband signal provided from the baseband processor into an RF band signal, transmits the same through an antenna, and down—converts an RF band signal received through the antenna into a baseband signal. The RF processor may include a transmission filter, a reception filter, an amplifier, a mi10r, an oscillator, a DAC, an ADC, and the like. The RF processor may perform a down link MIMO operation by transmitting at least one layer. The baseband processor performs a function of conversion between a baseband signal and a bit string according to the physical layer specification of the first radio access technology. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The backhaul interface unit 5B-04 provides an interface for communicating with other nodes inside the network. The backhaul interface unit 5B-04 converts a bit string transmitted from the base station to another node, for example, another base station or a core network, into a physical signal, and converts a physical signal received from the other node into a bit string.

What is claimed is:

1. A method by a terminal, the method comprising:
    transmitting, by the terminal to a base station, a UECapabilityInformation, wherein the UECapabilityInformation comprises a capability parameter related to Sounding Reference Signal (SRS) in RRC_INACTIVE;
    transmitting, by the terminal to a Location Management Function (LMF), a provideCapabilities, wherein the provideCapabilities comprises a capability parameter related to Positioning Reference Signal (PRS) in RRC_INACTIVE;
    receiving, by the terminal from the LMF, a ProvideAssistanceData, wherein the ProvideAssistanceData includes PRS assistance data, wherein the PRS assistance data comprises one or more PRS parameters and validity information;
    receiving, by the terminal from the base station, a RRCRelease, wherein the RRCRelease comprises:
    a first parameter relating to SRS in RRC_INACTIVE; and
    a second parameter relating to a Bandwidth Part (BWP); and
    transmitting, by the terminal to the base station based on the first parameter and the second parameter, a positioning SRS in RRC_INACTIVE state.

2. The method of claim 1,
    wherein the positioning SRS is transmitted in the BWP indicated by the second parameter.

3. The method of claim 1 further comprising,
    determining, by the terminal based on the validity information, that the one or more PRS parameters in the PRS assistance data is valid.

4. The method of claim 3,
    wherein the validity information comprises one or more New Radio (NR) Cell Global Identities.

5. The method of claim 4,
    wherein the validity information indicates the PRS assistance data is valid in one or more cells indicated by the one or more NR Cell Global Identities.

6. The method of claim 4,
    wherein the one or more PRS parameters comprises:
    one or more parameters for code sequences; and
    one or more parameters for starting slots.

7. The method of claim 3 further comprising,
    performing, by the terminal based on the determination and the PRS parameters, measurement on PRS.

8. The method of claim 1,
    wherein the RRCRelease further comprises:
    a third parameter indicating Signaling Radio Bearer2 (SRB2) is configured for small data transmission; and
    a fourth parameter indicating a counter for a security key.

9. The method of claim 1 further comprising,
transmitting, by the terminal to the base station, a Medium Access Control (MAC) Protocol Data Unit (PDU).

10. The method of claim 9,
wherein the MAC PDU comprises part of a Radio Resource Control (RRC) message associated with SRB2 based on that the RRCRelease comprises a third parameter.

11. The method of claim 10,
wherein the RRC message associated with SRB2 is ciphered by a security key derived from a fourth parameter.

12. The method of claim 9,
wherein a RRC message associated with SRB2 comprises a measurement result determined based on the PRS data.

13. The method of claim 1,
wherein the provideCapabilities further comprises a second capability parameter indicting support of SRS transmission in RRC_INACTIVE in a specific frequency band.

14. A terminal in a wireless communication system, the terminal comprising:
a transceiver configured to transmit and receive a signal; and
a controller configured to control the transceiver to:
transmit to a base station a UECapabilityInformation, wherein the UECapabilityInformation comprises a capability parameter related to Sounding Reference Signal (SRS) in RRC_INACTIVE;
transmit to a Location Management Function (LMF) a provideCapabilities, wherein the provideCapabilities comprises a capability parameter related to Positioning Reference Signal (PRS) in RRC_INACTIVE;
receive from the LMF a ProvideAssistanceData, wherein the ProvideAssistanceData includes PRS assistance data, wherein the PRS assistance data comprises one or more PRS parameters and validity information;
receive from the base station a RRCRelease, wherein the RRCRelease comprises:
a first parameter relating to SRS in RRC_INACTIVE; and
a second parameter relating to a Bandwidth Part (BWP); and
transmit to the base station, based on the first parameter and the second parameter, a positioning SRS in RRC_INACTIVE state.

* * * * *